United States Patent
Ishida

(10) Patent No.: US 10,805,545 B2
(45) Date of Patent: Oct. 13, 2020

(54) IMAGING DEVICE

(71) Applicant: FUJIFILM Corporation, Tokyo (JP)

(72) Inventor: Kazuki Ishida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/811,101

(22) Filed: Mar. 6, 2020

(65) Prior Publication Data

US 2020/0213521 A1 Jul. 2, 2020

Related U.S. Application Data

(63) Continuation of application No. PCT/JP2018/027524, filed on Jul. 23, 2018.

(30) Foreign Application Priority Data

Sep. 7, 2017 (JP) .................................. 2017-172326

(51) Int. Cl.
*H04N 5/232* (2006.01)
*H04N 5/225* (2006.01)

(52) U.S. Cl.
CPC ....... *H04N 5/23293* (2013.01); *H04N 5/2254* (2013.01); *H04N 5/23212* (2013.01); *H04N 5/23232* (2013.01); *H04N 5/23245* (2013.01)

(58) Field of Classification Search
CPC ........... H04N 5/23293; H04N 5/23245; H04N 5/23232; H04N 5/23212; H04N 5/2254
See application file for complete search history.

(56) References Cited

U.S. PATENT DOCUMENTS

| | | | | |
|---|---|---|---|---|
| 6,556,243 B1 * | 4/2003 | Dotsubo | ............. | H04N 1/2112 348/231.2 |
| 6,621,524 B1 * | 9/2003 | Iijima | .................... | H04N 5/262 348/584 |
| 7,024,053 B2 * | 4/2006 | Enomoto | ........... | H04N 5/23293 345/629 |

(Continued)

FOREIGN PATENT DOCUMENTS

| | | |
|---|---|---|
| JP | 2012-90065 A | 5/2012 |
| JP | 2014-131281 A | 7/2014 |
| WO | WO 2013/136601 A1 | 9/2013 |

OTHER PUBLICATIONS

International Search Report, issued in PCT/JP2018/027524, dated Oct. 23, 2018.

(Continued)

*Primary Examiner* — Timothy J Henn
(74) *Attorney, Agent, or Firm* — Birch, Stewart, Kolasch & Birch, LLP

(57) ABSTRACT

Provided is an imaging device capable of generating a desired synthesized image at an imaging stage without applying a processing load.
A viewfinder device (10) provided in a digital camera (1) has a function of superimposing and displaying information on an optical viewfinder image to be observed from a viewfinder eyepiece portion. In a case where a synthesis target image is pasted on a captured image to generate a synthesized image, the synthesis target image is displayed on the optical viewfinder image in a superimposed manner. A layout of the synthesis target image is adjusted by an operation of an operation unit (6). Further, the synthesis target image is automatically processed based on an image to be captured.

11 Claims, 17 Drawing Sheets

(56) References Cited

U.S. PATENT DOCUMENTS

| | | | |
|---|---|---|---|
| 7,551,211 B2* | 6/2009 | Taguchi | H04N 5/272 |
| | | | 348/239 |
| 8,448,079 B2* | 5/2013 | Matsutani | H04N 1/0035 |
| | | | 345/156 |
| 2014/0184841 A1 | 7/2014 | Woo et al. | |
| 2015/0009393 A1* | 1/2015 | Inoue | G03B 17/20 |
| | | | 348/346 |
| 2015/0036025 A1 | 2/2015 | Oshima et al. | |

OTHER PUBLICATIONS

Written Opinion of the International Searching Authority, issued in PCT/JP2018/027524, dated Oct. 23, 2018.

* cited by examiner

FIG. 9A
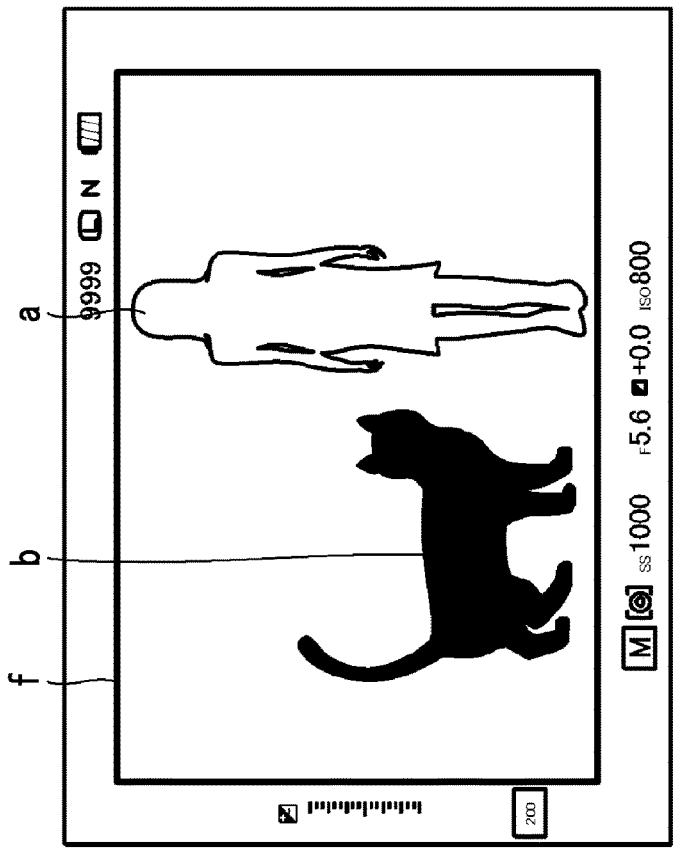
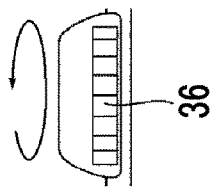
FIG. 9B
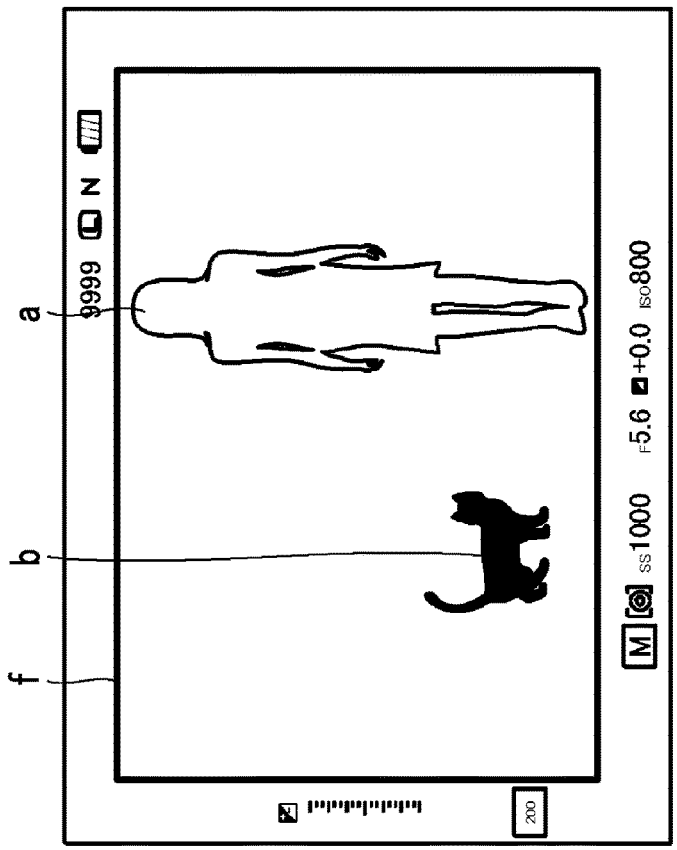
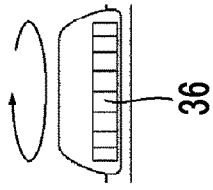

| (x−3, y+3) | (x−2, y+3) | (x−1, y+3) | (x, y+3) | (x+1, y+3) | (x+2, y+3) | (x+3, y+3) |
|---|---|---|---|---|---|---|
| (x−3, y+2) | (x−2, y+2) | (x−1, y+2) | (x, y+2) | (x+1, y+2) | (x+2, y+2) | (x+3, y+2) |
| (x−3, y+1) | (x−2, y+1) | (x−1, y+1) | (x, y+1) | (x+1, y+1) | (x+2, y+1) | (x+3, y+1) |
| (x−3, y) | (x−2, y) | (x−1, y) | (x, y) | (x+1, y) | (x+2, y) | (x+3, y) |
| (x−3, y−1) | (x−2, y−1) | (x−1, y−1) | (x, y−1) | (x+1, y−1) | (x+2, y−1) | (x+3, y−1) |
| (x−3, y−2) | (x−2, y−2) | (x−1, y−2) | (x, y−2) | (x+1, y−2) | (x+2, y−2) | (x+3, y−2) |
| (x−3, y−3) | (x−2, y−3) | (x−1, y−3) | (x, y−3) | (x+1, y−3) | (x+2, y−3) | (x+3, y−3) |

$$Q = \frac{\alpha \times D}{\beta \times Fno} \times \frac{\gamma}{R}$$

IMAGING DEVICE

CROSS-REFERENCE TO RELATED APPLICATIONS

The present application is a Continuation of PCT International Application No. PCT/JP2018/027524 filed on Jul. 23, 2018 claiming priority under 35 U.S.C § 119(a) to Japanese Patent Application No. 2017-172326 filed on Sep. 7, 2017. Each of the above applications is hereby expressly incorporated by reference, in its entirety, into the present application.

BACKGROUND OF THE INVENTION

1. Field of the Invention

The present invention relates to an imaging device, and more particularly to an imaging device having a function of generating a synthesized image.

2. Description of the Related Art

As an imaging device having a function of generating a synthesized image, JP2012-090065A proposes an imaging device capable of generating a synthesized image simultaneously with imaging by displaying a synthesis target image on a transmissive display element disposed on an optical path of an optical viewfinder. In the imaging device, a layout of the synthesized image can be adjusted at an imaging stage by adjusting a position of a synthesis target image on the transmissive display element.

On the other hand, JP2014-131281A proposes an imaging device capable of generating a synthesized image simultaneously with imaging by superimposing and displaying a synthesis target image on an image (live view image) to be displayed in a live view on a monitor. In the imaging device, a layout of the synthesized image can also be adjusted at an imaging stage by adjusting a position of a synthesis target image on a monitor. Further, JP2014-131281A proposes to automatically adjust a display position, size, color, brightness, and the like of the synthesis target image according to a feature of the live view image.

SUMMARY OF THE INVENTION

However, as shown in JP2014-131281A, real-time synthesis processing is required in a case where the synthesis target image is superimposed and displayed on the live view image. Therefore, there is a disadvantage in that a processing load on the device increases.

The invention has been made in view of such circumstances, and an object thereof is to provide an imaging device capable of generating a desired synthesized image at an imaging stage without a processing load.

Means for solving the above problem is as follows.

(1) An imaging device comprises an imaging lens, an imaging unit that receives light passing through the imaging lens and captures an image, operation unit, optical viewfinder, a superimposition display unit that superimposes and displays information to be output on an optical viewfinder image observed by the optical viewfinder, a synthesis target image acquisition unit that acquires a synthesis target image, a layout deciding unit that decides a layout of the synthesis target image based on an operation of the operation unit, a synthesis target image processing unit that processes the synthesis target image based on an image to be captured by the imaging unit, a superimposition display control unit that controls the superimposition display unit to superimpose and display the synthesis target image processed by the synthesis target image processing unit on the optical viewfinder image in the layout decided by the layout deciding unit, and a synthesized image generation unit that acquires the image captured by the imaging unit in response to an image recording instruction from the operation unit to synthesize the synthesis target image processed by the synthesis target image processing unit in the layout decided by the layout deciding unit to generate a synthesized image.

According to the aspect, the synthesis target image is superimposed and displayed on the optical viewfinder image by the superimposition display unit. The layout of the synthesis target image to be displayed in a superimposed manner can be adjusted by operating the operation unit. Accordingly, it is possible to generate a synthesized image having a desired layout at the imaging stage. Further, the synthesis target image to be displayed in a superimposed manner is automatically processed by the synthesis target image processing unit based on the image captured by the imaging unit. Accordingly, it is possible to generate a synthesized image with a natural finish without any sense of incompatibility. Further, it is possible to reduce the processing load on the device since the these pieces of processing do not involve synthesis processing.

(2) The imaging device of (1), in which the synthesis target image processing unit performs a process of defocusing the synthesis target image based on difference information between a focusing position of a subject and a position where the synthesis target image is disposed.

According to the aspect, the synthesis target image processing unit performs the process of defocusing the synthesis target image. Specifically, the process of defocusing the synthesis target image is performed based on the difference information between the focusing position of the subject and the position where the synthesis target image is disposed. Accordingly, it is possible to generate a synthesized image with a natural finish without any sense of incompatibility.

(3) The imaging device of (2), in which the synthesis target image processing unit changes a defocus amount according to an F number of the imaging lens.

According to the aspect, the defocus amount mat be changed according to the F number of the imaging lens. Accordingly, it is possible to generate a synthesized image with a natural finish without any sense of incompatibility.

(4) The imaging device of (2) or (3), in which the synthesis target image processing unit changes a resolution of the synthesis target image as the process of defocusing the synthesis target image.

According to the aspect, the process of changing the resolution of the synthesis target image is performed as the process of defocusing the synthesis target image. Accordingly, it is possible to simplify processing.

(5) The imaging device of any one of (1) to (4), in which the synthesis target image processing unit changes brightness of the synthesis target image according to brightness of a position where the synthesis target image is disposed.

According to the aspect, the synthesis target image processing unit performs the process of changing the brightness of the synthesis target image. Specifically, the brightness of the synthesis target image is changed according to the brightness of the position where the synthesis target image is disposed. Accordingly, it is possible to generate a synthesized image with a natural finish without any sense of incompatibility.

(6) The imaging device of any one of (1) to (5), in which the synthesis target image processing unit changes a tone of the synthesis target image according to a white balance correction amount of the image captured by the imaging unit.

According to the aspect, the synthesis target image processing unit performs the process of changing the tone of the synthesis target image. Specifically, the tone of the synthesis target image is changed according to the white balance correction amount of the image to be captured by the imaging unit. Accordingly, it is possible to generate a synthesized image with a natural finish without any sense of incompatibility.

(7) The imaging device of any one of (1) to (6), in which the superimposition display control unit further causes at least one of setting information of the imaging device or a frame indicating an imaging range to be superimposed and displayed on the optical viewfinder image as an in-viewfinder display, and changes a display mode of the in-viewfinder display in a case where the synthesis target image overlaps the in-viewfinder display.

According to the aspect, at least one of the setting information of the imaging device or the frame indicating the imaging range is superimposed and displayed on the optical viewfinder image as the in-viewfinder display. Accordingly, it is possible to improve the operability. The display mode of the in-viewfinder display is changed in a case where the synthesis target image overlaps the in-viewfinder display. Accordingly, it is possible to improve the visibility of the synthesis target image.

(8) The imaging device of (7), in which the superimposition display control unit changes brightness of the in-viewfinder display in the case where the synthesis target image overlaps the in-viewfinder display.

According to the aspect, the brightness of the in-viewfinder display is changed in a case where the synthesis target image overlaps the in-viewfinder display. Accordingly, it is possible to improve the visibility of the synthesis target image.

(9) The imaging device of any one of (1) to (8) further comprises a communication unit that communicates with a server. The synthesis target image acquisition unit communicates with the server through the communication unit to acquire the synthesis target image from the server.

According to the aspect, the synthesis target image may be acquired from the external server by communicating with the external server. Accordingly, it is possible to expand the number and kind of synthesis target images that can be acquired.

(10) The imaging device of any one of (1) to (9), in which the operation unit includes a touch panel and the layout deciding unit decides the layout of the synthesis target image based on an operation of the touch panel.

According to the aspect, the operation unit may include the touch panel and the layout of the synthesis target image may be adjusted by operating the touch panel. Accordingly, it is possible to further improve the operability.

(11) The imaging device of any one of (1) to (10), in which the synthesis target image processing unit further processes the synthesis target image based on the operation of the operation unit.

According to the aspect, the synthesis target image may be processed manually. Accordingly, it is possible to generate a synthesized image closer to the preference of the user.

According to the invention, it is possible to generate the desired synthesized image at the imaging stage without applying the processing load.

Figure 7:
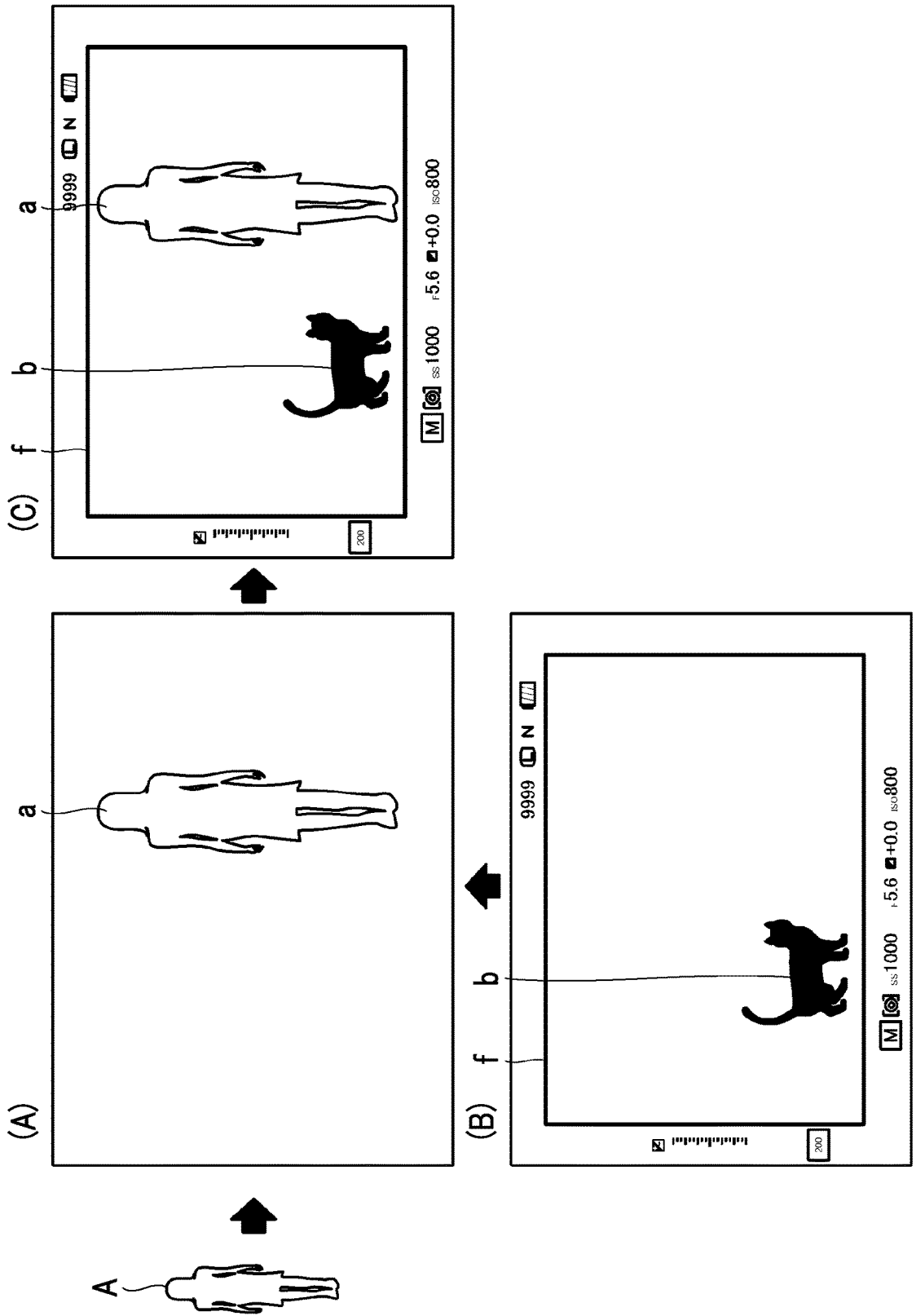

(A), (B), and (C) of FIG. 7 are conceptual diagrams of a superimposition display.

Figure 8:
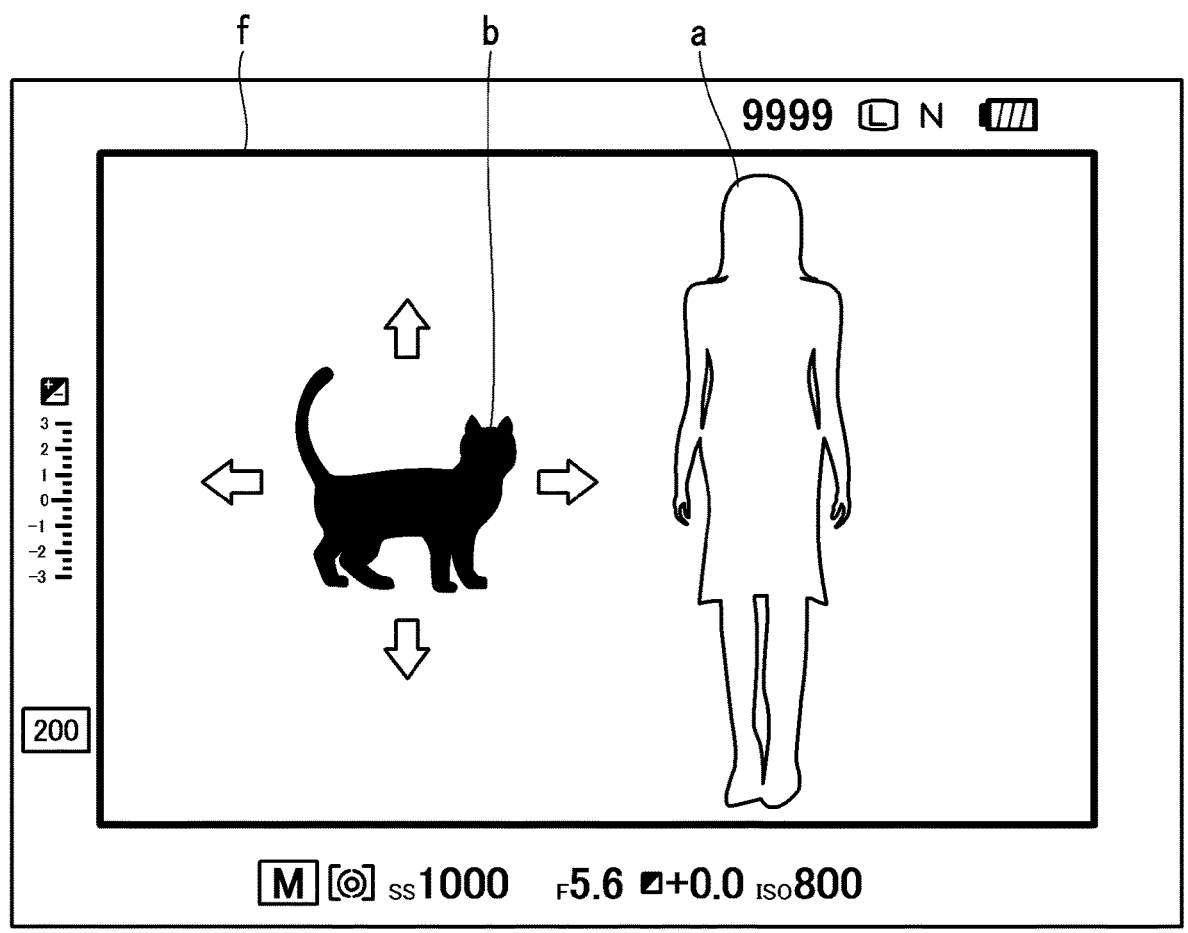

FIG. 8 is a conceptual diagram of position adjustment of a synthesis target image.

FIGS. 9A and 9B are conceptual diagrams of size adjustment of the synthesis target image.

Figure 10:
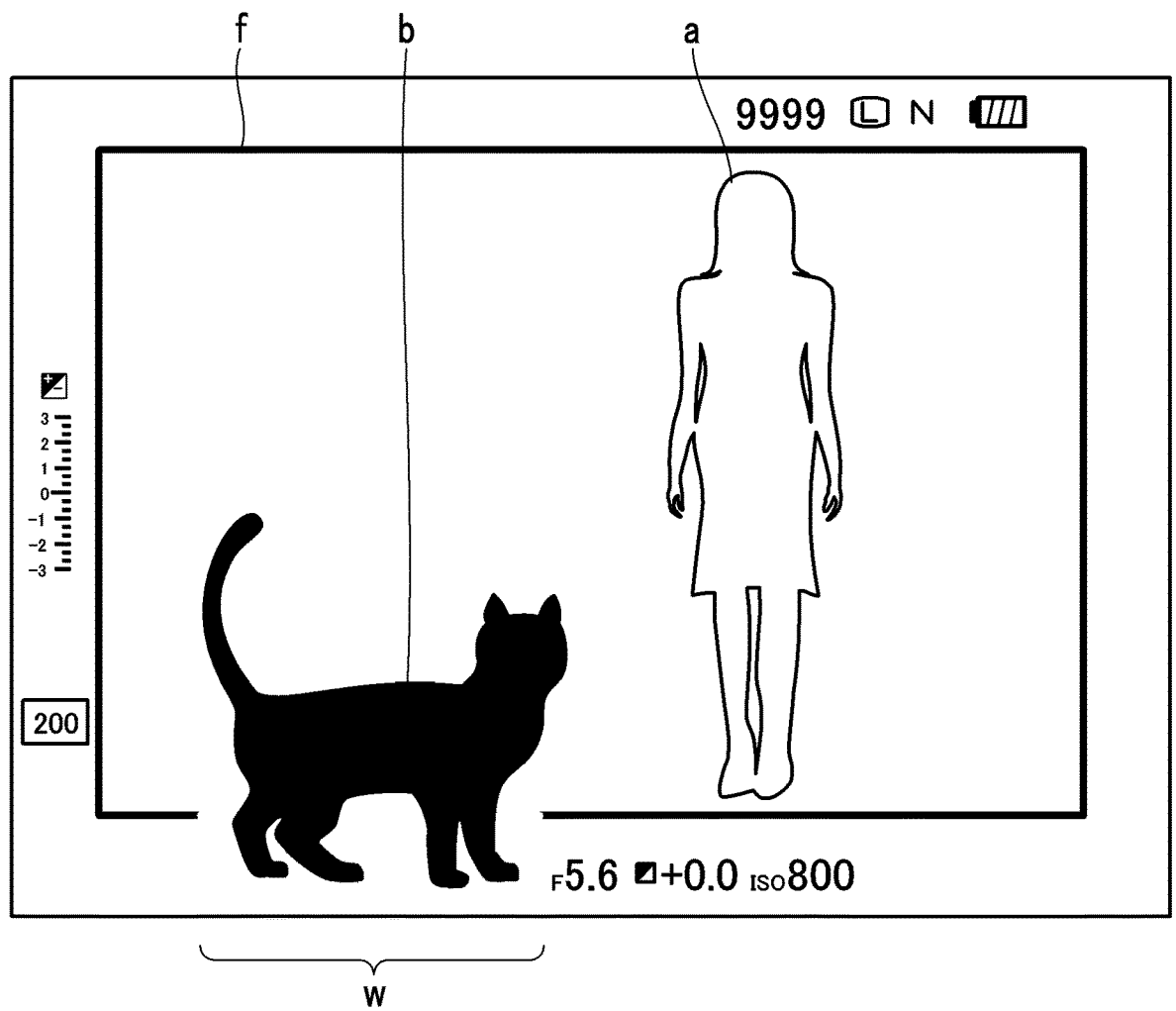

FIG. 10 is a diagram showing an example of changing a display mode of an in-viewfinder display.

Figure 11:
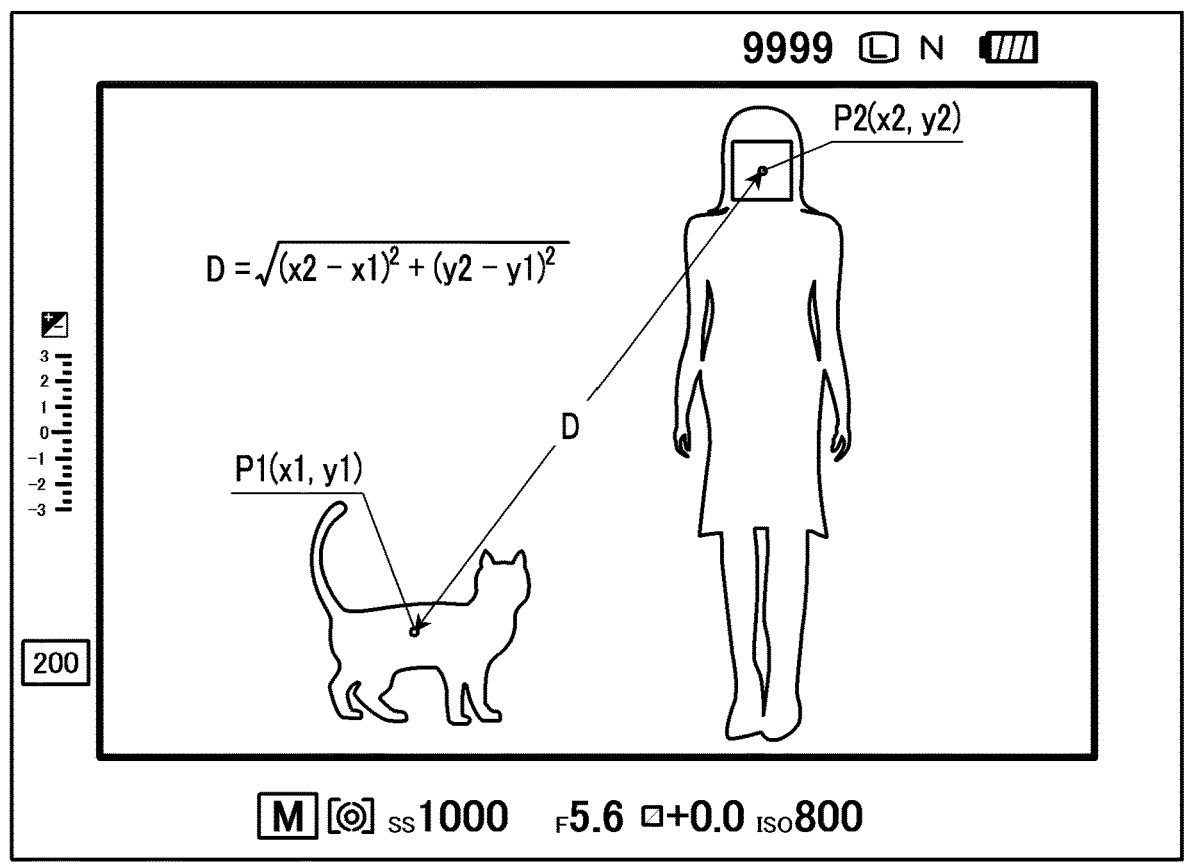

FIG. 11 is a conceptual diagram of distance acquisition.

FIG. 12 is a conceptual diagram of a process of defocusing an image.

Figure 13:
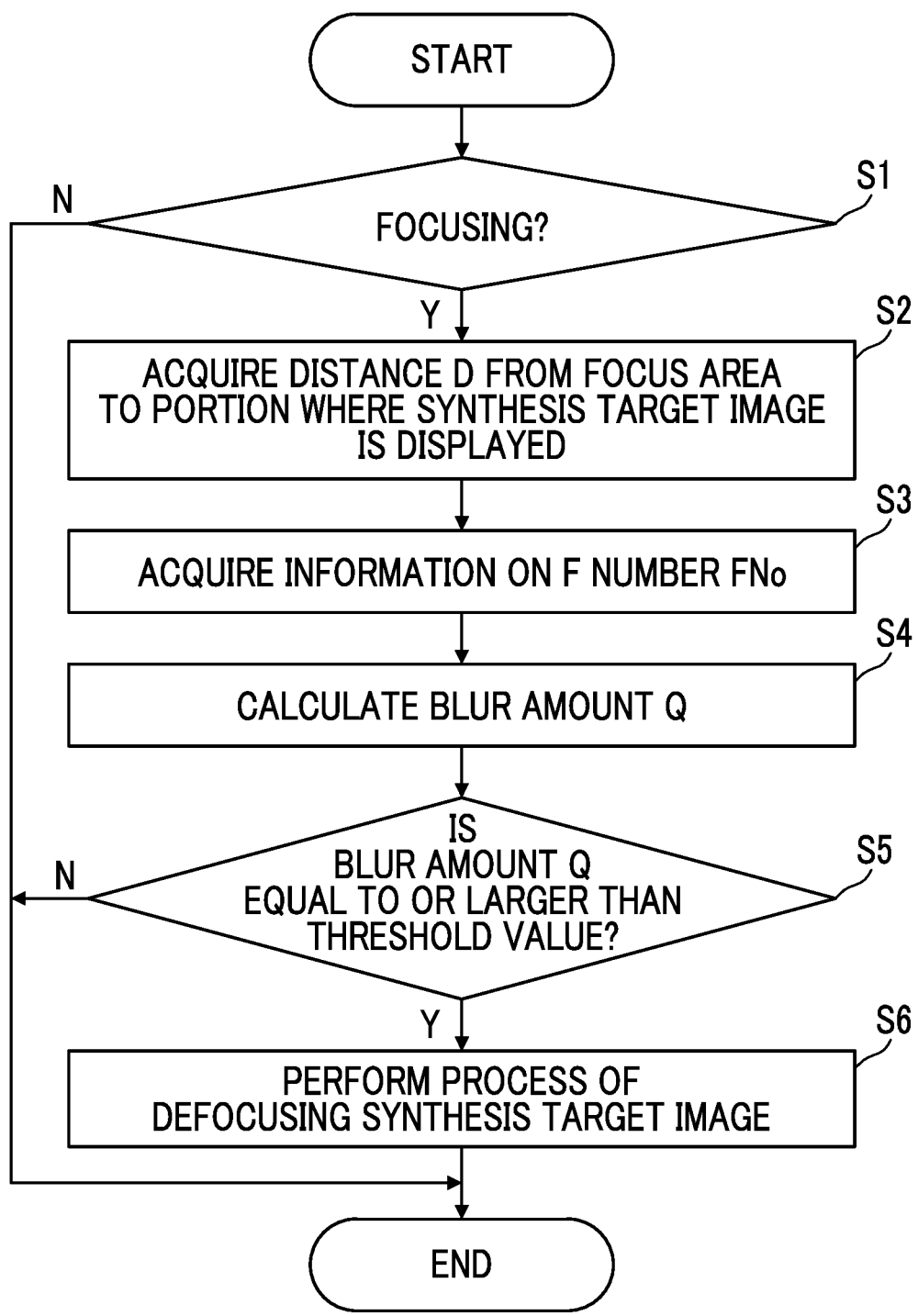

FIG. 13 is a flowchart showing a processing procedure for a process of defocusing a synthesis target image.

Figure 14:
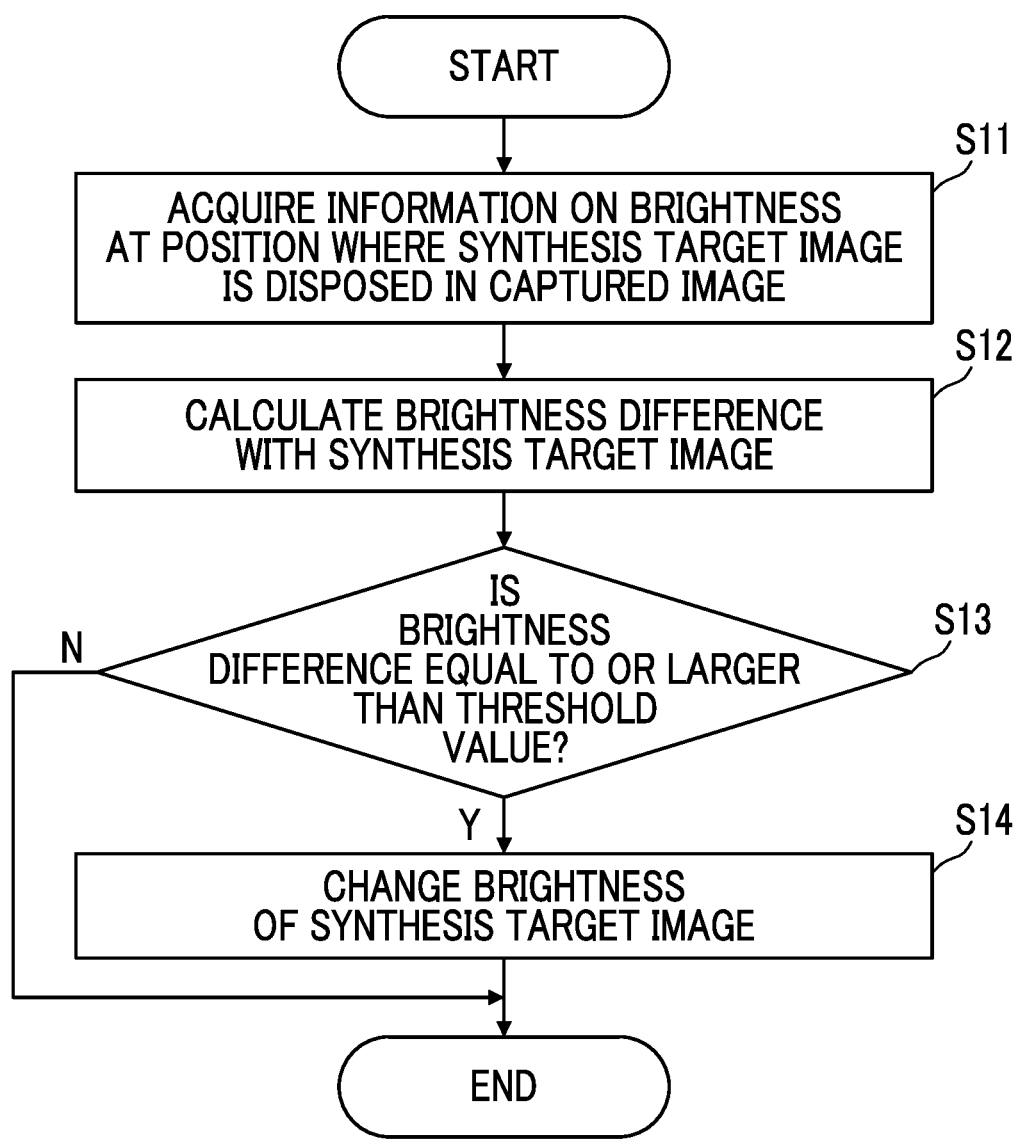

FIG. 14 is a flowchart showing a processing procedure for a process of changing brightness of a synthesis target image.

Figure 15:
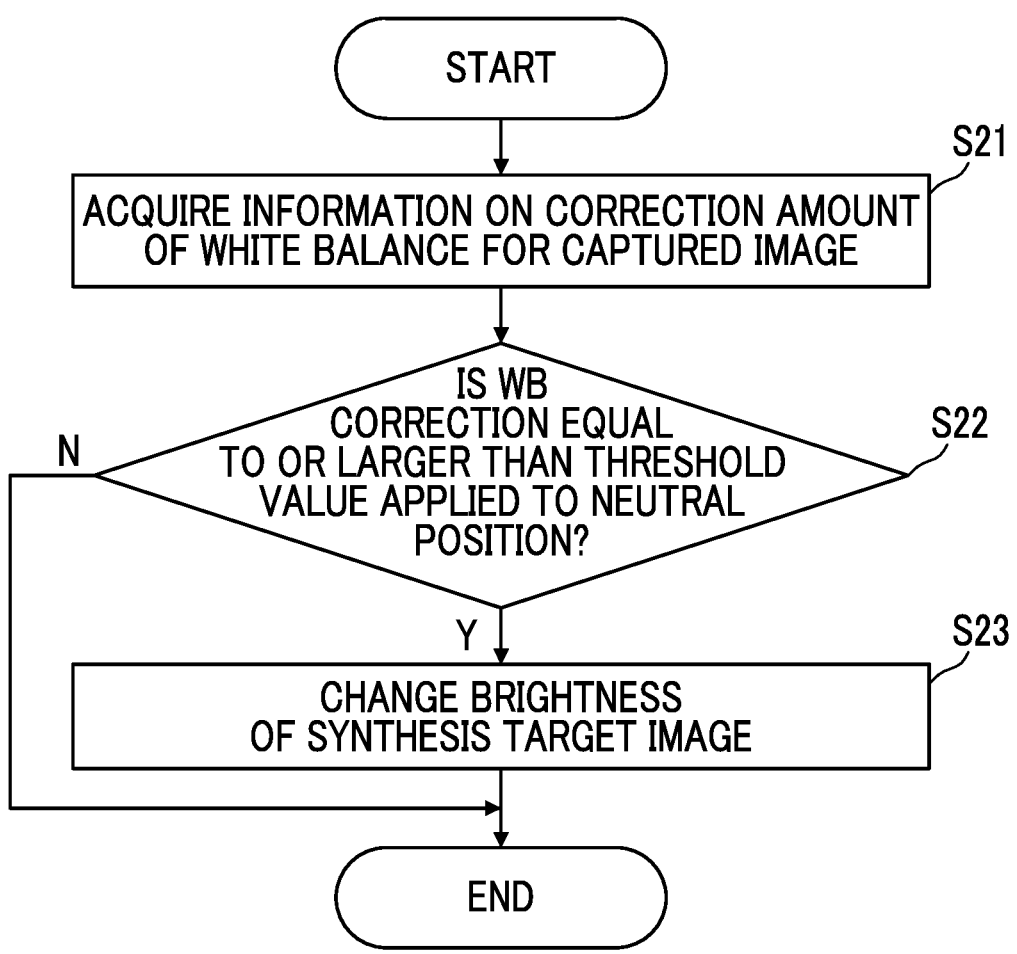

FIG. 15 is a flowchart showing a processing procedure for a process of changing a tone of a synthesis target image.

Figure 16:
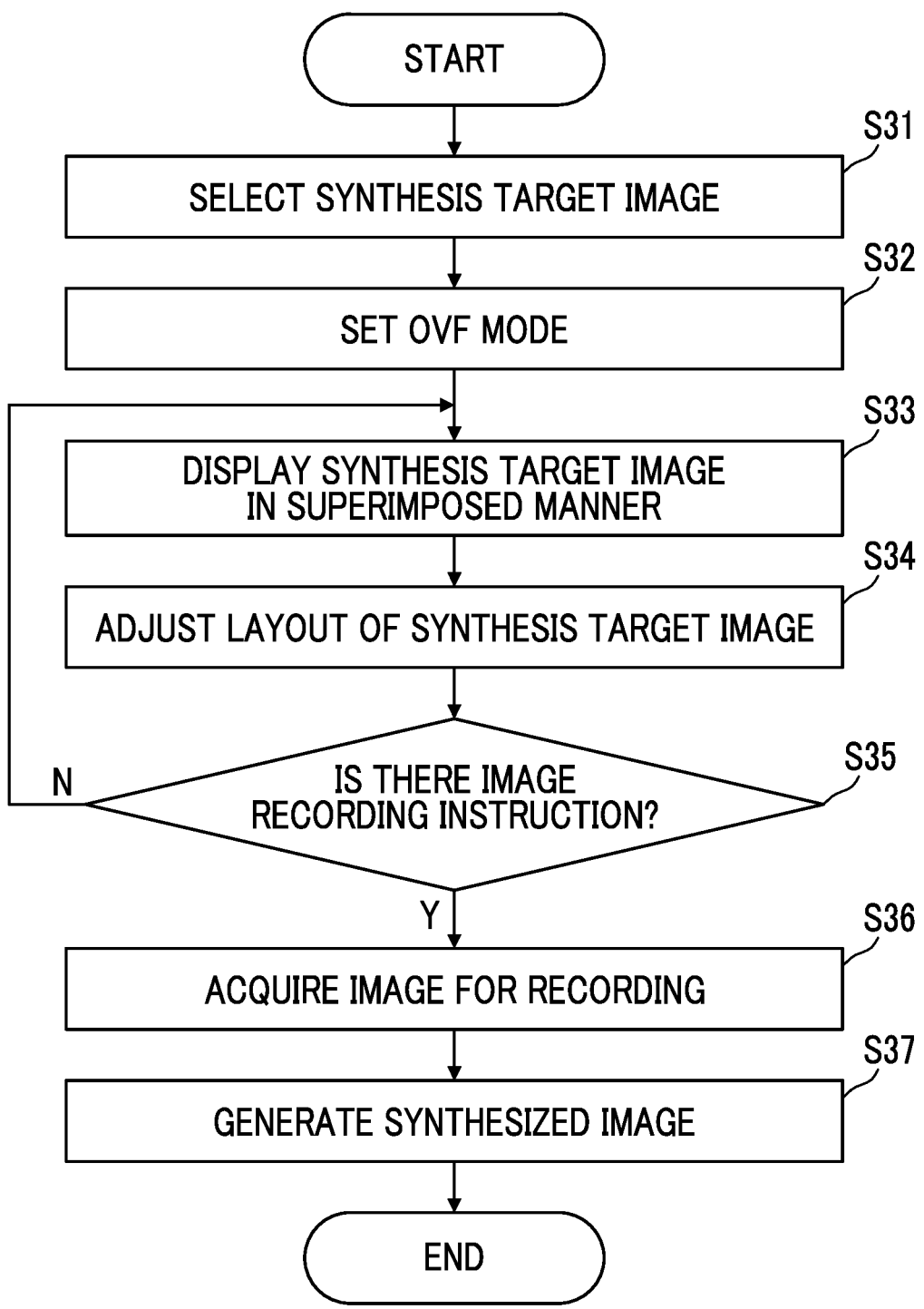

FIG. 16 is a flowchart showing a processing procedure of imaging in the synthesized photograph mode.

Figure 17:
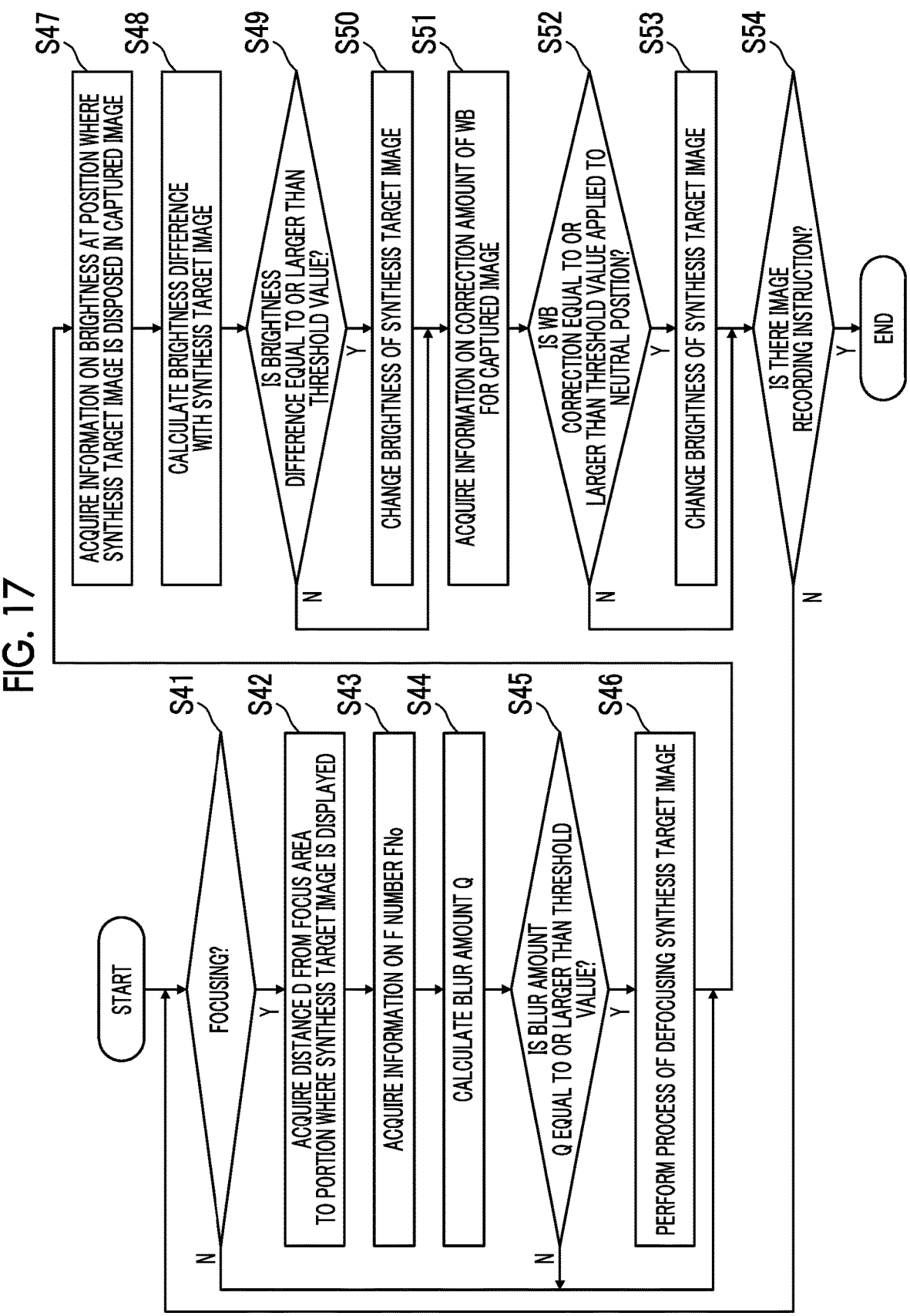

FIG. 17 is a flowchart showing a processing procedure of image processing for a synthesis target image.

DESCRIPTION OF THE PREFERRED EMBODIMENTS

Hereinafter, preferable embodiments for implementing the invention will be described with reference to accompanying drawings.

[Configuration]

[External Structure]

Figure 1:
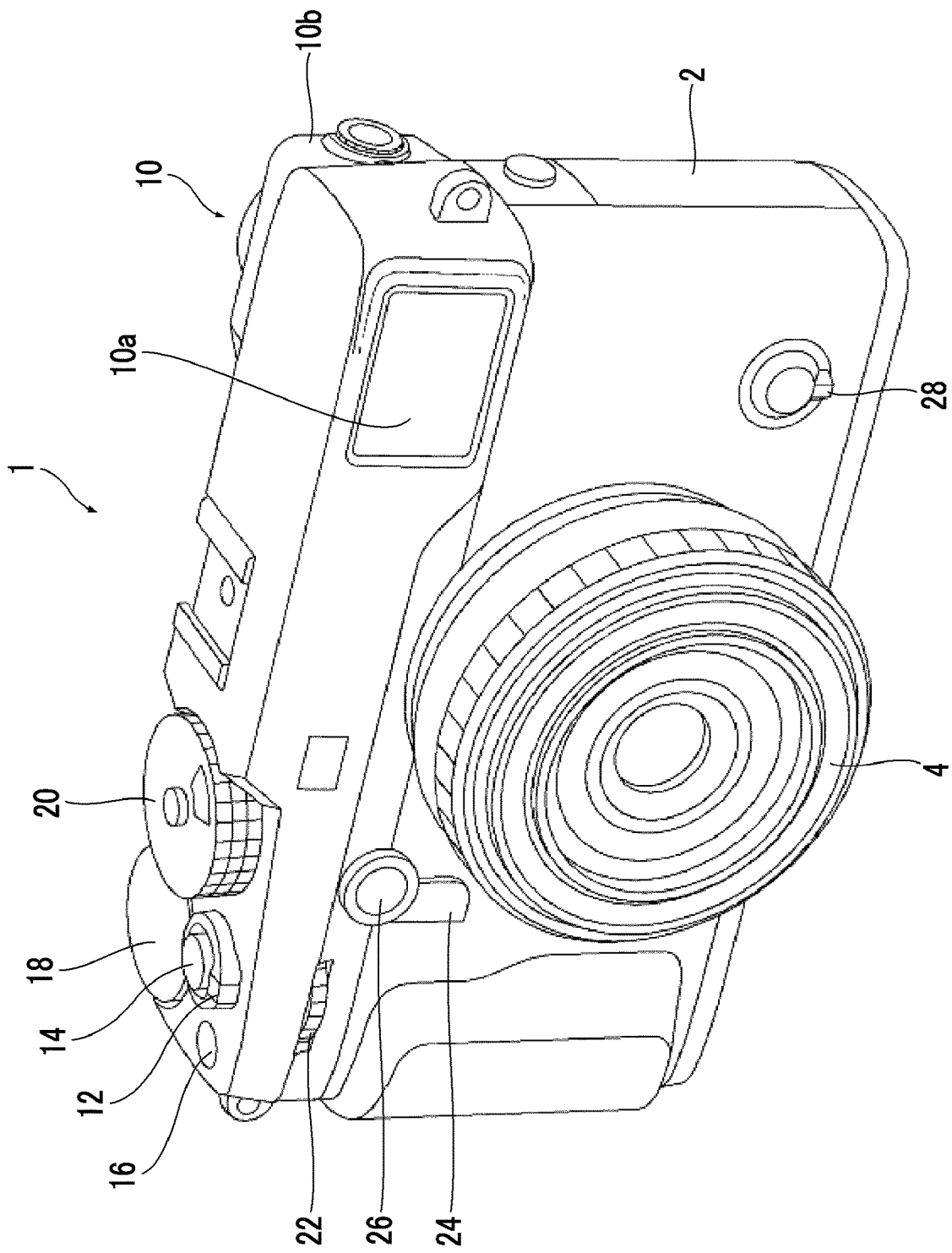
FIG. 1 is a front surface perspective view of an appearance configuration of an embodiment of a digital camera to which the invention is adapted.
Figure 2:
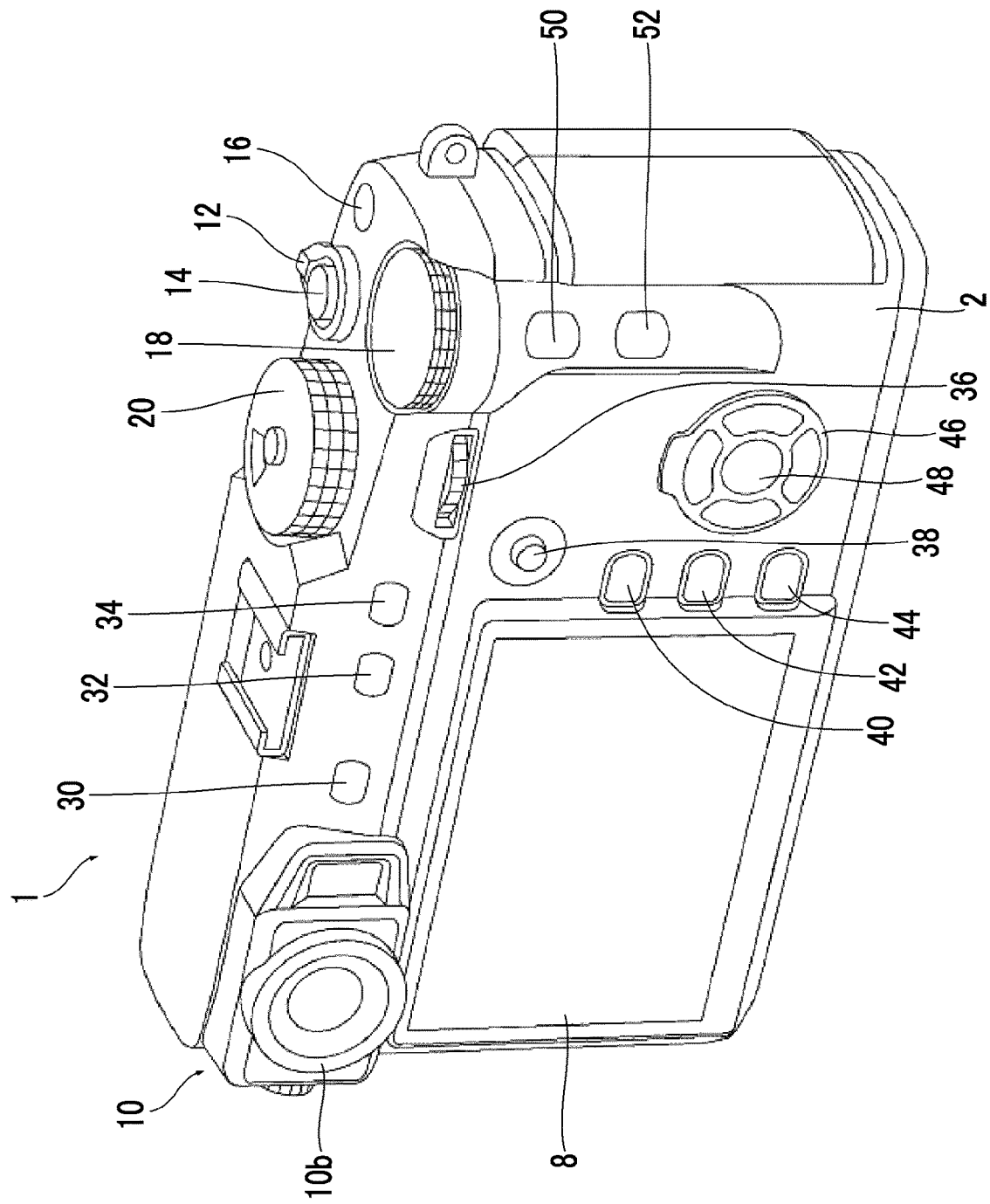
FIG. 2 is a rear surface perspective view of the digital camera shown in FIG. 1.

FIG. 1 is a front surface perspective view of an appearance configuration of an embodiment of a digital camera to which the invention is adapted. FIG. 2 is a rear surface perspective view of the digital camera shown in FIG. 1.

A digital camera 1 shown in FIGS. 1 and 2 is a lens-integrated digital camera in which an imaging lens 4 is integrally assembled with a camera body 2.

The digital camera 1 is an example of an imaging device. The digital camera 1 includes an imaging lens 4, an operation unit 6, a rear surface monitor 8, a viewfinder device 10, and the like in the camera body 2.

The imaging lens 4 is provided on the front surface of the camera body 2. The imaging lens 4 is composed of a single focus lens having a focusing function and is composed by combining a plurality of lenses.

The operation unit 6 includes a power lever 12, a shutter button 14, a first function button 16, an exposure correction dial 18, a shutter speed/sensitivity dial 20, a front command dial 22, a viewfinder switching lever 24, a second function button 26, a focus mode switching lever 28, a view mode button 30, a photometry mode button 32, an automatic exposure (AE) lock button 34, a rear command dial 36, a focus lever 38, a playback button 40, an erase button 42, a back button 44, a cross button 46, a MENU/OK button 48, an auto focus (AF) lock button 50, a quick menu button 52, and the like. The power lever 12, the shutter button 14, the first function button 16, the exposure correction dial 18, and the shutter speed/sensitivity dial 20 are provided on the upper surface of the camera body 2. The front command dial 22, the viewfinder switching lever 24, the second function button 26, and the focus mode switching lever 28 are provided on the front surface of the camera body 2. The view mode button 30, the photometry mode button 32, the AE lock button 34, the rear command dial 36, the focus lever 38, the playback button 40, the erase button 42, the back button 44, the cross button 46, the AF lock button 50, and the quick menu button 52 are provided on the rear surface of the camera body 2.

The rear surface monitor 8 is provided on the rear surface of the camera body 2. The rear surface monitor 8 is an example of a display unit. The rear surface monitor 8 is composed of, for example, a liquid crystal display (LCD).

The viewfinder device 10 is a hybrid type viewfinder device capable of switching between an optical viewfinder (OVF) mode and an electronic viewfinder (EVF) mode. The viewfinder device 10 includes a viewfinder window 10a on the front surface side of the camera body 2 and a viewfinder eyepiece portion 10b on the rear surface side.

Figure 3:
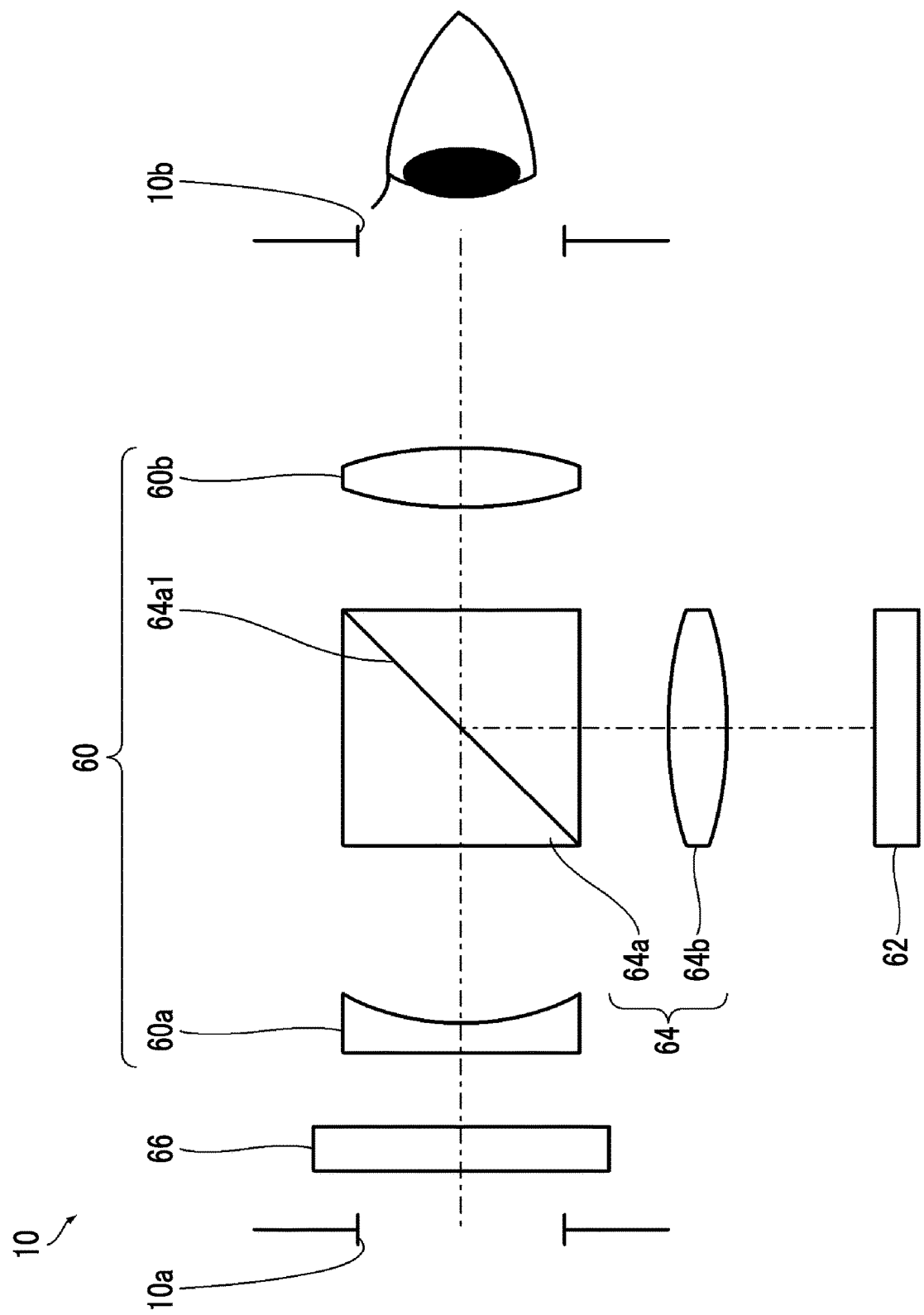
FIG. 3 is a schematic configuration diagram of a viewfinder device.

FIG. 3 is a schematic configuration diagram of a viewfinder device.

The viewfinder device 10 includes a viewfinder first optical system 60, a viewfinder LCD 62, a viewfinder second optical system 64, and a liquid crystal shutter 66.

The viewfinder first optical system 60 is an optical system for optically observing a subject. The viewfinder first optical system 60 includes an objective lens group 60a and an eyepiece lens group 60b. The viewfinder first optical system 60 constitutes an optical viewfinder.

The viewfinder second optical system 64 is an optical system that guides an image displayed on the viewfinder LCD 62 to an optical path of the viewfinder first optical system 60. The viewfinder second optical system 64 and the viewfinder LCD 62 constitute a superimposition display unit. The viewfinder second optical system 64 includes a half prism 64a and a target lens group 64b.

The half prism 64a is disposed between the objective lens group 60a and the eyepiece lens group 60b of the viewfinder first optical system 60. The half prism 64a has a semipermeable membrane 64a1 on a slope therein. The semipermeable membrane 64a1 divides light incident perpendicularly to an incident surface of the half prism 64a into transmitted light and reflected light.

The target lens group 64b is disposed between the viewfinder LCD 62 and the half prism 64a and guides light from the viewfinder LCD 62 to the eyepiece lens group 60b through the half prism 64a.

The liquid crystal shutter 66 is disposed between the viewfinder window 10a and the objective lens group 60a. The liquid crystal shutter 66 opens and closes the viewfinder window 10a. That is, the light from the viewfinder window 10a is transmitted by "opening", and the light from the viewfinder window 10a is blocked by "closing".

In the viewfinder device 10 having the above configuration, in a case where the liquid crystal shutter 66 is opened, the light from the subject transmits through the objective lens group 60a, the half prism 64a, and the eyepiece lens group 60b and is guided to the viewfinder eyepiece portion 10b. Accordingly, in a case where the viewfinder eyepiece portion 10b is viewed, an optical image (optical viewfinder image) of the subject can be observed.

In a case where the image is displayed on the viewfinder LCD 62 in a state where the liquid crystal shutter 66 is opened, the light from the viewfinder LCD 62 enters the half prism 64a through the target lens group 64b. The light incident on the half prism 64a is reflected by the semipermeable membrane 64a1 and guided to the eyepiece lens group 60b. As a result, in a case where the viewfinder eyepiece portion 10b is viewed, the image on the viewfinder LCD 62 is observed in a superimposed manner on the optical viewfinder image observed by the viewfinder first optical system 60.

On the other hand, in a case where the liquid crystal shutter 66 is closed, the incidence of light on the objective lens group 60a is blocked. Accordingly, even in a case where the viewfinder eyepiece portion 10b is viewed, the optical viewfinder image cannot be observed. On the other hand, the light from the viewfinder LCD 62 is guided to the viewfinder eyepiece portion 10b. Therefore, the image on the viewfinder LCD 62 can be observed.

A mode in which the optical viewfinder image can be observed is the OVF mode, and a mode in which only the image on the viewfinder LCD 62 can be observed is the EVF mode. The switching between the OVF mode and the EVF mode is performed by operating the viewfinder switching lever 24. The viewfinder switching lever 24 is provided so as to be able to swing, and the OVF mode and the EVF mode are switched alternately each time the lever is swung. The liquid crystal shutter 66 is opened in a case where the OVF mode is set, and the liquid crystal shutter 66 is closed in a case where the EVF mode is set.

[Internal Structure]

Figure 4:
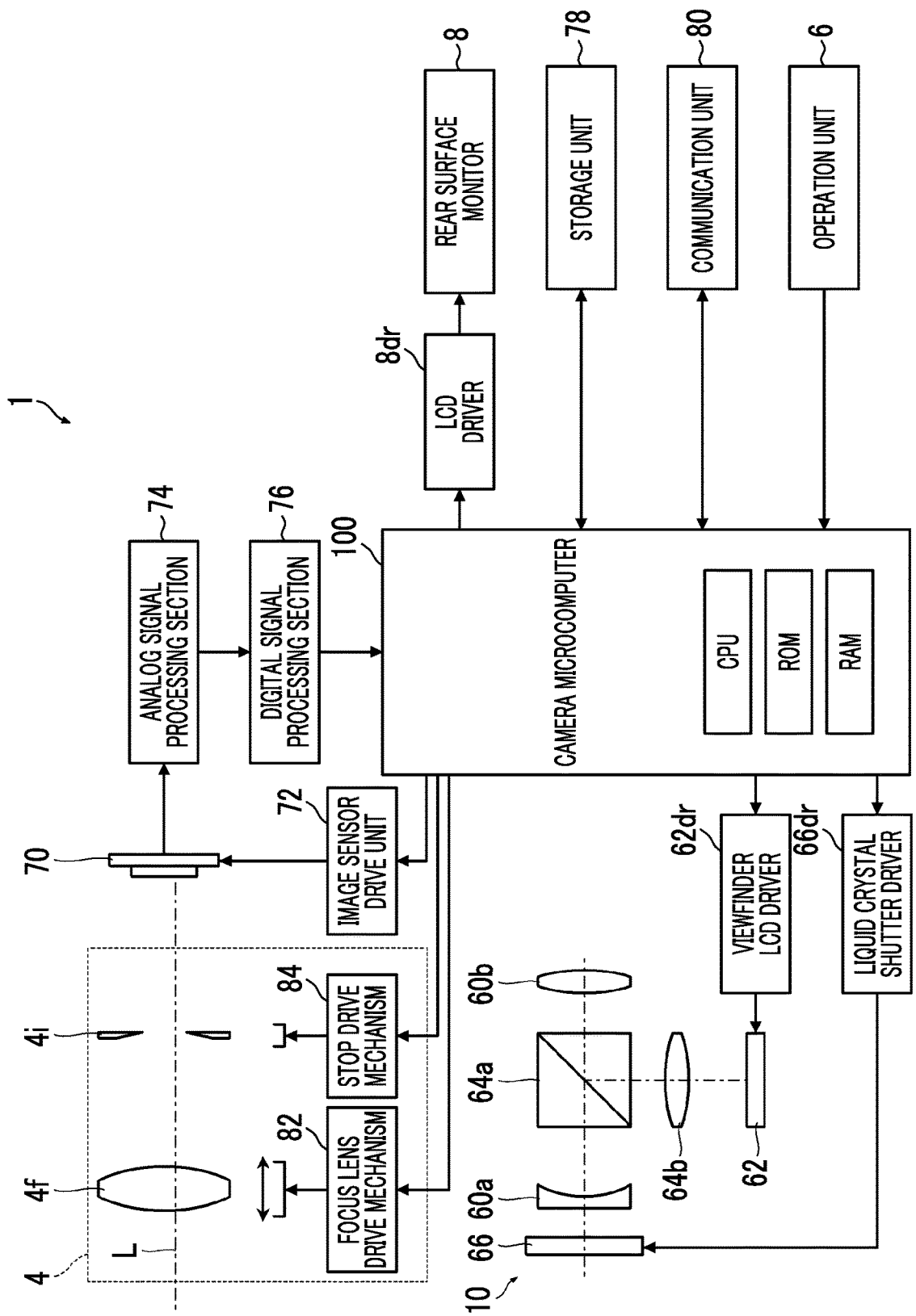
FIG. 4 is a schematic configuration diagram of the inside of the digital camera.

FIG. 4 is a schematic configuration diagram of the inside of the digital camera.

The digital camera 1 includes an imaging lens 4, a viewfinder device 10, an image sensor 70, an image sensor drive unit 72, an analog signal processing section 74, a digital signal processing section 76, a rear surface monitor 8, a storage unit 78, a communication unit 80, and an operation unit 6, a camera microcomputer 100, and the like.

<<Imaging Lens>>

As described above, the imaging lens 4 is composed by combining the plurality of lenses. The imaging lens 4 includes a focus lens drive mechanism 82 and a stop drive mechanism 84. The focus lens drive mechanism 82 includes an actuator and a drive circuit thereof, and causes a focus lens group 4f to move along an optical axis L in response to an instruction from the camera microcomputer 100. Accordingly, the focus is adjusted. The stop drive mechanism 84 includes an actuator and a drive circuit thereof, and operates a stop 4i in response to an instruction from the camera microcomputer 100. That is, an opening amount is switched. Accordingly, an amount of light incident on the image sensor 70 is adjusted.

<<Viewfinder Device>>

In the viewfinder device 10, the display of the viewfinder LCD 62 is controlled by the camera microcomputer 100 through a viewfinder LCD driver 62dr. In the viewfinder device 10, the drive of the liquid crystal shutter 66 is controlled by the camera microcomputer 100 through a liquid crystal shutter driver 66dr.

<<Image Sensor>>

The image sensor 70 receives the light passing through the imaging lens 4 and captures an image. The image sensor 70 is an example of an imaging unit. The image sensor 70 is composed of a known two-dimensional image sensor such as a complementary metal-oxide semiconductor (CMOS) type or a charge coupled device (CCD) type.

<<Image Sensor Drive Unit>>

The image sensor drive unit 72 drives the image sensor 70 in response to an instruction from the camera microcomputer 100. The image sensor 70 is driven by the image sensor drive unit 72 to read out an electric charge accumulated in each pixel as an image signal.

<<Analog Signal Processing Section>>

The analog signal processing section 74 captures an analog image signal for each pixel to be output from the image sensor 70 and performs predetermined signal processing (for example, correlative double sampling processing or amplifying processing). The analog signal processing section 74 includes an analog to digital converter (ADC), converts an analog image signal after the predetermined signal processing into a digital image signal, and outputs the digital image signal.

<<Digital Signal Processing Section>>

The digital signal processing section 76 captures the digital image signal output from the analog signal processing section 74 and performs predetermined signal processing (for example, gradation transformation processing, white balance correction processing, gamma-correction processing, demosaicing processing, or YC conversion processing) to generate image data. The generated image data is output to the camera microcomputer 100.

The digital signal processing section 76 detects information on brightness of the subject necessary for exposure control based on the captured image signal. The information on the brightness of the detected subject is output to the camera microcomputer 100.

Further, the digital signal processing section 76 detects information on contrast of the subject necessary for autofocus control based on the captured image signal. The information on the detected contrast is output to the camera microcomputer 100.

<<Rear Surface Monitor>>

The display on the rear surface monitor 8 is controlled by the camera microcomputer 100 through an LCD driver 8dr.

<<Storage Unit>>

The storage unit 78 stores various types of data including image data. A synthesis target image is also stored in the storage unit 78. The storage unit 78 is composed of including a built-in memory and a control circuit that reads and writes data from and to the built-in memory. The built-in memory is composed of, for example, a nonvolatile memory such as an electrically erasable programmable read only memory (EEPROM). The reading and writing of the data with respect to the storage unit 78 is controlled by the camera microcomputer 100.

The storage unit 78 may also be composed of an external memory such as a so-called memory card. In the case, the digital camera 1 is provided with a card slot or the like for loading the memory card.

<<Communication Unit>>

The communication unit 80 communicates with an external apparatus wirelessly or wiredly under the control of the camera microcomputer 100 to transmit and receive various signals to and from each other. A communication method is not particularly limited. A commonly used communication method (for example, a communication method based on a wireless local area network (LAN) standard, a communication method based on a specific power-saving wireless standard, or a communication method using a cellular phone network), a communication method based on a Universal Serial Bus (USB) standard, or the like is used.

<<Operation Unit>>

The operation unit 6 outputs a signal in response to the operation of each operation member to the camera microcomputer 100.

<<Camera Microcomputer>>

The camera microcomputer 100 functions as a control unit that integrally controls the overall operation of the digital camera 1. The camera microcomputer 100 functions as an arithmetic processing unit that calculates a physical amount necessary for controlling the digital camera 1. The camera microcomputer 100 is composed of a computer (microcomputer) that includes a central processing unit (CPU), a random access memory (RAM), and a read only memory (ROM). The camera microcomputer 100 executes predetermined programs such as a focus control program, an exposure control program, a display control program, and an image synthesis program to realize various types of functions. The programs executed by the camera microcomputer 100, various types of data necessary for control, and the like are stored in the ROM.

Figure 5:
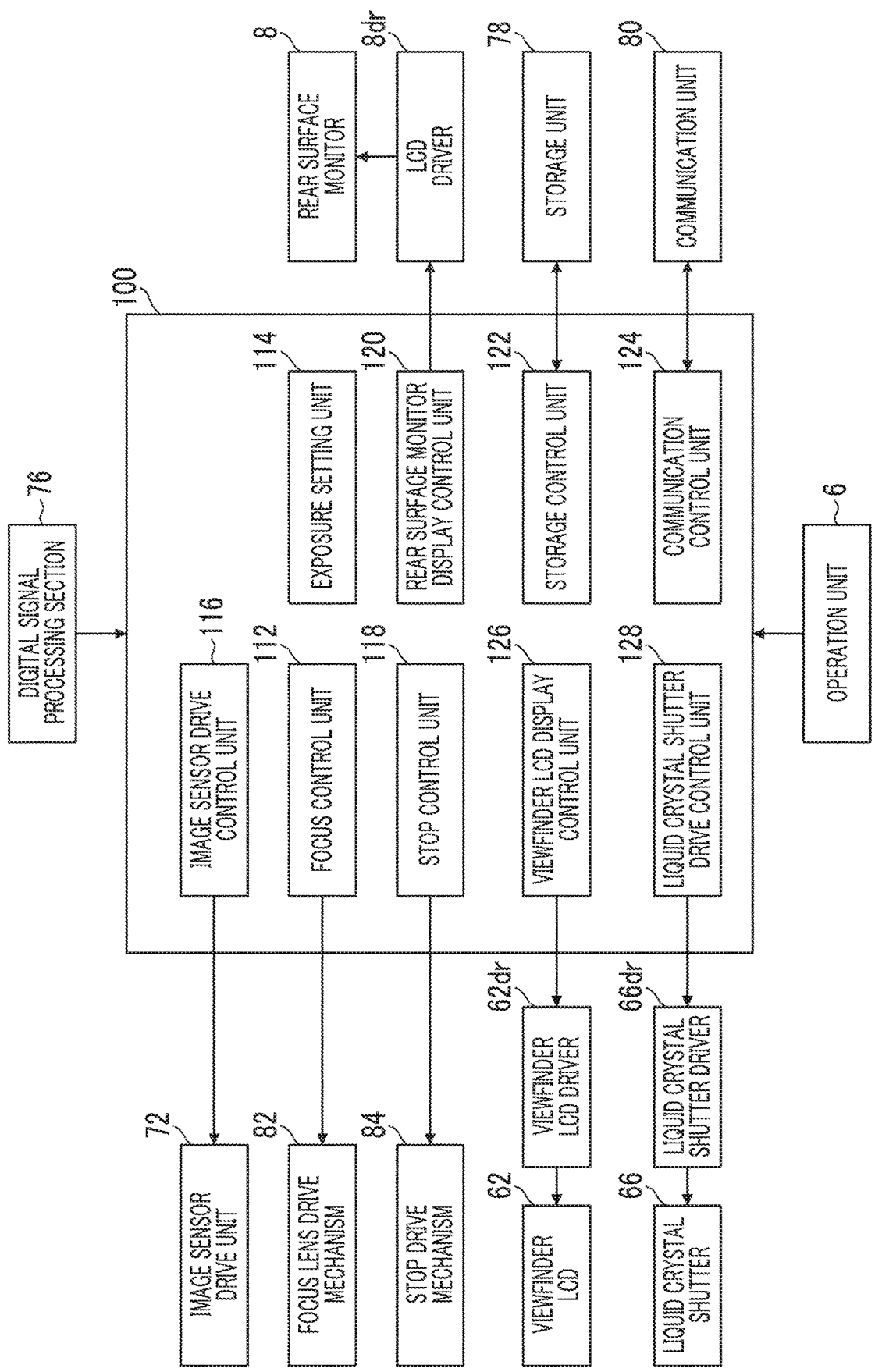
FIG. 5 is a block diagram of main functions realized by a camera microcomputer.

FIG. 5 is a block diagram of main functions realized by the camera microcomputer.

As shown in the same figure, the camera microcomputer 100 functions as a focus control unit 112, an exposure setting unit 114, an image sensor drive control unit 116, a stop control unit 118, a rear surface monitor display control unit 120, a storage control unit 122, a communication control unit 124, a viewfinder LCD display control unit 126, a liquid crystal shutter drive control unit 128, and the like.

<Focus Control Unit>

The focus control unit 112 performs so-called contrast-type autofocus control. That is, a position where the contrast is maximized is detected by moving the focus lens group 4f from the closest end to the infinity end, and the focus lens group 4f is moved to the detected position.

<Exposure Setting Unit>

The exposure setting unit 114 sets a shutter speed (exposure time) and an F number at which proper exposure is performed based on the detection result of the brightness of the subject.

<Image Sensor Drive Control Unit>

The image sensor drive control unit 116 controls the drive of the image sensor 70 through the image sensor drive unit 72 such that exposure is performed at the shutter speed set by the exposure setting unit 114.

<Stop Control Unit>

The stop control unit 118 controls the stop 4i through the stop drive mechanism 84 such that the F number set by the exposure setting unit 114 is obtained.

<Rear Surface Monitor Display Control Unit>

The rear surface monitor display control unit 120 controls display on the rear surface monitor 8 through the LCD driver 8dr. For example, in a case where image data obtained by imaging is displayed on the rear surface monitor 8, the image data is converted into a data format that can be displayed on the rear surface monitor 8 and output to the rear surface monitor 8.

<Storage Control Unit>

The storage control unit 122 controls the reading and writing of the data with respect to the storage unit 78. The image data obtained by imaging is stored in the storage unit 78 through the storage control unit 122. In a case where the image data stored in the storage unit 78 is played back, the image data is read out from the storage unit 78 through the storage control unit 122.

<Communication Control Unit>

The communication control unit 124 controls communication with an external apparatus through the communication unit 80.

<Viewfinder LCD Display Control Unit>

The viewfinder LCD display control unit 126 controls the display on the viewfinder LCD 62 through the viewfinder LCD driver 62*dr*. As described above, the image to be displayed on the viewfinder LCD 62 is superimposed on the optical viewfinder image. Therefore, the viewfinder LCD display control unit 126 also functions as a superimposition display control unit.

<Liquid Crystal Shutter Drive Control Unit>

The liquid crystal shutter drive control unit 128 controls the drive of the liquid crystal shutter 66 through the liquid crystal shutter driver 66*dr* to open and close the liquid crystal shutter 66.

<<Functions Realized by Camera Microcomputer in Synthesized Photograph Mode>>

As described below, the digital camera 1 according to the embodiment includes a synthesized photograph mode as one of imaging modes thereof. The synthesized photograph mode is a mode for capturing an image on which images selected by a user are pasted.

Figure 6:
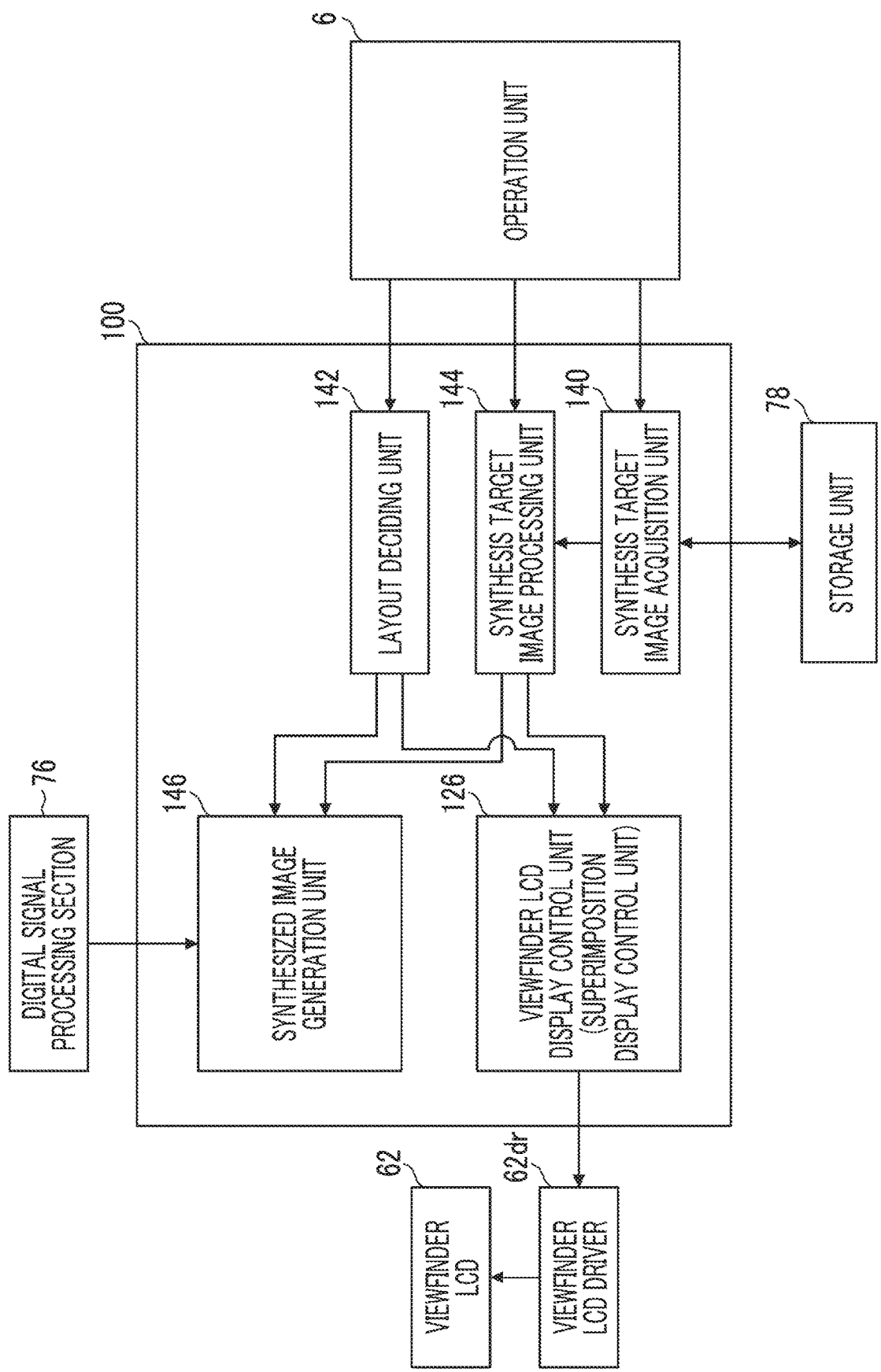
FIG. 6 is a block diagram of functions realized by the camera microcomputer in a synthesized photograph mode.

FIG. 6 is a block diagram of functions realized by the camera microcomputer in the synthesized photograph mode.

As shown in the same figure, the camera microcomputer 100 functions as a synthesis target image acquisition unit 140, a layout deciding unit 142, a synthesis target image processing unit 144, and a synthesized image generation unit 146 in a case where the synthesized photograph mode is set.

<Synthesis Target Image Acquisition Unit>

The synthesis target image acquisition unit 140 performs a process of acquiring a synthesis target image. The synthesis target image is an image to be pasted on the captured image. The synthesis target image is stored in the storage unit 78. The synthesis target image acquisition unit 140 reads out the synthesis target images stored in the storage unit 78, displays the read synthesis target images on the rear surface monitor 8, and allows the user to select one image to be used for synthesizing. Specifically, the rear surface monitor 8 displays a list of a plurality of synthesis target images stored in the storage unit 78, and the user selects one image to be used for synthesizing by operating the operation unit 6. For example, the cursor is moved by the operation of the cross button 46 to select one image to be used for synthesizing by the operation of the MENU/OK button 48. Alternatively, the rear surface monitor 8 displays a plurality of synthesis target images stored in the storage unit 78 one by one based on the operation of the operation unit 6, and the user selects one image to be used for synthesizing.

<Layout Deciding Unit>

The layout deciding unit 142 performs a process of deciding a layout of the synthesis target image based on the operation of the operation unit 6. That is, a process of deciding a disposition position and size of the selected synthesis target image in a screen is performed. The position is adjusted with the cross button 46, and the size is adjusted with the rear command dial 36.

In a case where the layout is decided, the viewfinder LCD display control unit 126 causes the viewfinder LCD 62 to display the synthesis target image. Accordingly, the synthesis target image is displayed on the optical viewfinder image in a superimposed manner.

(A), (B), and (C) of FIG. 7 are conceptual diagrams of a superimposition display.

(A) of FIG. 7 shows an in-viewfinder display in a case where the superimposition display is not performed. In this case, only an image of a subject A is observed as shown in the same figure.

(B) of FIG. 7 shows a screen display of the viewfinder LCD 62. As shown in the same figure, a frame f indicating an imaging range and various types of setting information are displayed in addition to a synthesis target image b as the in-viewfinder display on the viewfinder LCD 62. The various types of setting information are information indicating current settings or the like of the digital camera 1 and include the imaging mode, an exposure mode, a shutter speed, the F number, an exposure correction value, setting sensitivity, the number of images that can be captured, a battery remaining amount, and the like. The various types of setting information are displayed in a blank region around the frame f.

(C) of FIG. 7 shows the in-viewfinder display in a case where the superimposition display is performed. As shown in the same figure, the image displayed on the viewfinder LCD 62 is displayed on the optical viewfinder image in a superimposed manner.

In a case where the cross button 46 is operated during the superimposition display of the synthesis target image, the position of the synthesis target image moves according to an operation direction and operation amount thereof.

FIG. 8 is a conceptual diagram of position adjustment of the synthesis target image.

As shown by arrows in the same figure, the synthesis target image b can be moved in the four directions of up, down, left and right in the screen. These four directions coincide with the operation direction of the cross button 46. That is, in a case where the cross button 46 is operated in the upward direction, the synthesis target image b moves upward in the screen according to the operation amount thereof. In a case where the cross button 46 is operated in the downward direction, the synthesis target image b moves downward in the screen according to the operation amount thereof. Further, in a case where the cross button 46 is operated leftward in the screen, the synthesis target image b moves in the left direction according to the operation amount thereof. In a case where the cross button 46 is operated rightward in the screen, the synthesis target image b moves in the right direction according to the operation amount thereof.

In a case where the rear command dial 36 is operated during the superimposition display of the synthesis target image, the display size of the synthesis target image b is switched according to the operation direction and operation amount thereof.

FIGS. 9A and 9B are conceptual diagrams of size adjustment of the synthesis target image. FIG. 9A shows a case where the synthesis target image b is reduced, and FIG. 9B shows a case where the synthesis target image b is enlarged.

As shown in FIG. 9A, in a case where the rear command dial 36 is rotationally operated clockwise, the synthesis target image b is reduced according to the operation amount thereof.

On the other hand, as shown in FIG. 9B, in a case where the rear command dial 36 is rotationally operated counterclockwise, the synthesis target image b is enlarged according to the operation amount.

As described above, in a case where the synthesis target image b is moved or the size thereof is changed, the synthesis target image b may overlap the in-viewfinder display (frame f indicating imaging range and various types of setting information). In such a case, the viewfinder LCD display control unit 126 changes a display mode of the in-viewfinder display in a region where the synthesis target image b overlaps.

FIG. 10 is a diagram showing an example of changing the display mode of the in-viewfinder display.

In the example shown in the same figure, a display color in the in-viewfinder display is reversely displayed in a region w where the synthesis target image b overlaps. In addition, the in-viewfinder display can be erased or the brightness thereof can be changed in the region w where the synthesis target image b overlaps.

In this manner, it is possible to improve the visibility of the synthesis target image b by changing the display mode of the in-viewfinder display of the region where the synthesis target image b overlaps.

It is effective to change the brightness of the in-viewfinder display in a case where the in-viewfinder display is displayed in a bright color such as white. Accordingly, it is possible to effectively prevent the visibility of the synthesis target image b from being lowered due to excessive brightness of the in-viewfinder display.

<Synthesis Target Image Processing Unit>

The synthesis target image processing unit 144 processes the synthesis target image based on an image to be captured by the image sensor 70. The processing includes (1) process of defocusing the synthesis target image, (2) process of changing the brightness of the synthesis target image, and (3) process of changing the tone of the synthesis target image.

(1) Process of Defocusing the Synthesis Target Image

In the process of defocusing the synthesis target image, a process of defocusing the synthesis target image is performed based on difference information between a focusing position of the subject and a position where the synthesis target image is disposed. Specifically, first, a distance from a focus area to a portion where the synthesis target image is displayed is acquired.

FIG. 11 is a conceptual diagram of distance acquisition.

FIG. 11 shows an example of a case where the face of the subject is in focus. A position of the focus area is defined as the center position of an AF frame F. The position of the focus area corresponds to the focusing position of a subject a. A position of a focusing target image is defined as a position of the gravity center of the focusing target image. Therefore, the distance from the focus area to the portion where the synthesis target image is displayed is defined as a distance D from the center of the AF frame F to the position of the gravity center of the focusing target image.

Now, in a case where it is assumed that coordinates of a position P1 of the gravity center of the synthesis target image are (x1,y1) and coordinates of a position P2 of the focus area are (x2,y2), the distance D is calculated by $[(x2-x1)^2+(y2+y1)^2]^{1/2}$.

The position coordinates P1($x1$,y1) of the gravity center of the synthesis target image and the position coordinates P2($x2$,y2) of the focus area are respectively position coordinates on the captured image (image captured by the image sensor 70). Therefore, the position coordinates P1($x1$,y1) of the gravity center of the synthesis target image are converted into the position coordinates on the captured image. That is, a position on the captured image corresponding to the position of the synthesis target image displayed on the viewfinder LCD 62 is calculated to acquire the position coordinates P1($x1$,y1) of the gravity center of the synthesis target image.

In the above example, the position of the gravity center of the focusing target image is set as the position of the focusing target image. However, it is more preferable that the position of the gravity center of the focusing target image is set as appropriate according to a kind or the like of the synthesis target image. For example, in a case where the synthesis target image is a person, the position of the face may be set as the position of the synthesis target image.

Next, a degree of blur is calculated based on the acquired information on the distance D (difference information between the focusing position of the subject and the position where the synthesis target image is disposed) and the information on the F number. A blur amount Q is calculated by the following equation, for example.

$$Q=[(\alpha \times D)/(\beta \times FNo)] \times (\gamma/R)$$

Here, $\alpha$, $\beta$, and $\gamma$ are coefficients, D is the distance from the focus area to the portion where the synthesis target image is displayed, FNo is an F number, and R is a screen resolution of the viewfinder LCD 62.

Next, determination is made whether or not a calculated blur amount Q is within an allowable range. Specifically, determination is made whether or not the calculated blur amount Q is equal to or larger than a threshold value to determine whether or not the calculated blur amount Q is within the allowable range. In a case where the calculated blur amount Q is equal to or larger than the threshold value, determination is made that the allowable range is exceeded. The blur processing is performed only in a case where the allowable range is exceeded.

The blur processing is performed based on the calculated blur amount. That is, the larger the blur amount, the larger a defocus amount. In the embodiment, the process of defocusing the synthesis target image is performed by lowering the resolution of the synthesis target image.

FIG. 12 is a conceptual diagram of the process of defocusing an image.

The process of defocusing the image is performed by lowering the image resolution using so-called smoothing. Specifically, a frame of (1+2Q)×(1+2Q) is set as a processing target frame, and an average value of pixel values of all pixels in the frame is set as a pixel value of a processing target pixel (x,y). For example, in a case where the calculated blur amount Q is two, a 5×5 frame is set as a processing target frame FC, and the average value of the pixel values of all the pixels in the frame is set as the pixel value of the processing target pixel (x,y). Accordingly, the resolution is lowered according to the blur amount. In addition, an average value of pixel values of up to Q pixels adjacent to the processing target pixel (x,y) may be calculated, and the calculated value may be used as the pixel value of the processing target pixel (x,y).

FIG. 13 is a flowchart showing a processing procedure for the process of defocusing the synthesis target image.

First, the presence or absence of a focusing operation is determined (step S1). That is, the presence or absence of an operation for focusing on the subject is determined. In a case where the focusing operation is performed, the distance D from the focus area to the portion where the synthesis target image is displayed is acquired (step S2). Next, information on a currently set F number FNo of the imaging lens 4 is acquired (step S3). Next, the blur amount Q is calculated based on the acquired information on the distance D and the F number FNo (step S4). Next, determination is made whether or not the calculated blur amount Q is equal to or larger than a threshold value (step S5). In a case where the calculated blur amount Q is less than the threshold value, the defocus processing is not performed and the processing ends. On the other hand, in a case where the calculated blur amount Q is equal to or larger than the threshold value, the process of defocusing the synthesis target image is performed (step S6). The process of defocusing the synthesis target image is performed based on the calculated blur amount Q and is performed by lowering the resolution of the synthesis target image according to the blur amount.

(2) Process of Changing the Brightness of the Synthesis Target Image

In the process of changing the brightness of the synthesis target image, the brightness of the synthesis target image is changed according to the brightness of a position where the synthesis target image is disposed. Specifically, a difference between brightness at the position where the synthesis target image is disposed in the captured image and brightness of the synthesis target image is calculated, and the brightness of the synthesis target image is changed according to the difference.

FIG. 14 is a flowchart showing a processing procedure for the process of changing the brightness of the synthesis target image.

First, information on the brightness at the position where the synthesis target image is disposed in the captured image is acquired (step S11). Next, a difference between the acquired brightness and the brightness of the synthesis target image is calculated (step S12). Next, determination is made whether or not the calculated brightness difference is equal to or larger than a threshold value (step S13). In a case where the brightness difference is less than the threshold value, the process of changing the brightness is not performed and the processing ends. On the other hand, in a case where the brightness difference is equal to or larger than the threshold value, the brightness of the synthesis target image is changed according to the brightness difference (step S14).

(3) Process of Changing the Tone of the Synthesis Target Image

In the process of changing the tone of the synthesis target image, the tone of the synthesis target image is changed according to a white balance correction amount for the captured image. Specifically, the tone of the synthesis target image is changed in a case where white balance correction equal to or larger than a threshold value is applied to a neutral position.

FIG. 15 is a flowchart showing a processing procedure for the process of changing the tone of the synthesis target image.

First, information on the white balance correction amount for the captured image is acquired (step S21). Next, determination is made whether or not the white balance correction equal to or larger than the threshold value is applied to the neutral position, based on the acquired white balance correction amount information (step S22). In a case where the white balance correction equal to or larger than the threshold value is not applied, the process of changing the tone is not performed and the processing ends. On the other hand, in a case where the white balance correction equal to or larger than the threshold value is applied, the tone of the synthesis target image is changed based on the white balance correction amount with respect to the neutral position (step S23).

As described above, the synthesis target image processing unit 144 processes the synthesis target image based on the image captured by the image sensor 70. The viewfinder LCD display control unit 126 causes the viewfinder LCD 62 to display the synthesis target image after the processing. Accordingly, it is possible to check the image after the processing with the viewfinder device 10.

<Synthesized Image Generation Unit>

The synthesized image generation unit 146 performs generation processing of a synthesized image. Specifically, the image captured by the image sensor 70 is acquired in response to an image recording instruction, and the synthesis target image processed by the synthesis target image processing unit 144 is synthesized with the layout decided by the layout deciding unit 142 to generate a synthesized image.

[Action]

<<Normal Processing Procedure of Imaging>>

First, a normal processing procedure of imaging will be described.

Any of the OVF, the EVF, and the rear surface monitor 8 can be used in a normal imaging mode. However, only one selected among the above can actually be used.

In a case where the OVF is selected, the viewfinder LCD 62 displays the frame indicating the imaging range and the setting information. Accordingly, in a case where the viewfinder eyepiece portion 10b is viewed, the frame indicating the imaging range and the setting information are displayed on the optical viewfinder image in a superimposed manner.

In a case where the EVF is selected, then image captured by the image sensor 70 is live-viewed on the viewfinder LCD 62. The live view image is displayed in a predetermined frame, and the setting information is displayed in a blank region around the frame.

In a case where the rear surface monitor 8 is selected, the image captured by the image sensor 70 is live-viewed on the rear surface monitor 8. The live view image is displayed in a predetermined frame, and the setting information is displayed in a blank region around the frame.

In a case where switching is made to the rear surface monitor 8 for use in a state where the OVF or the EVF is selected, the view mode button 30 is pressed. Similarly, in a case where switching is made to the OVF or the EVF for use in a state where the rear surface monitor 8 is selected, the view mode button 30 is pressed. Accordingly, a target to be used is switched. The switching between the OVF and the EVF is performed by operating the viewfinder switching lever 24.

The image recording is performed by operating the shutter button 14. The shutter button 14 is composed of a two-step stroke type button that can be so-called pressed halfway and fully, and imaging preparation is performed by pressing the button halfway. That is, each piece of processing of the AE, the AF, and an auto white balance (AWB) is performed. In a case where the shutter button 14 is pressed halfway, then further pressed, and is pressed fully, the image recording instruction is performed to perform image recording processing. That is, an image for recording is captured, subjected to necessary signal processing, and stored in the storage unit 78.

<<Processing Procedure of Imaging in Synthesized Photograph Mode>>

As described above, the digital camera 1 according to the embodiment includes the synthesized photograph mode as one of the imaging modes. A setting to the synthesized photograph mode is performed, for example, on a menu screen. The menu screen is called by pressing the quick menu button 52 or the MENU/OK button 48. Hereinafter, a processing procedure of imaging in the synthesized photograph mode will be described.

FIG. 16 is a flowchart showing the processing procedure of imaging in the synthesized photograph mode.

First, a process of selecting a synthesis target image is performed (step S31). As described above, the processing is performed by the synthesis target image acquisition unit 140. The synthesis target image acquisition unit 140 reads out the synthesis target images stored in the storage unit 78, displays the read synthesis target images on the rear surface monitor 8, and allows the user to select one image to be used for synthesizing.

In a case where the synthesis target image is selected, the mode of the viewfinder device 10 is automatically set to the OVF mode (step S32). That is, the OVF is used in the synthesized photograph mode.

In a case where the mode of the viewfinder device 10 is set to the OVF mode, the synthesis target image is displayed on the viewfinder LCD 62 as shown in (B) of FIG. 7. Accordingly, as shown in (C) of FIG. 7, the synthesis target image is displayed on the optical viewfinder image in a superimposed manner (step S33). The synthesis target image to be displayed on the optical viewfinder image in a superimposed manner is processed as necessary. That is, the process of defocusing the synthesis target image based on the difference information between the focusing position of the subject and the position where the synthesis target image is disposed, the process of changing the brightness of the synthesis target image according to the brightness at the position where the synthesis target image is disposed, and the process of changing the tone of the synthesis target image according to the white balance correction amount for the captured image are performed.

FIG. 17 is a flowchart showing a processing procedure of the image processing for the synthesis target image.

First, the defocus processing is performed. First, the presence or absence of the focusing operation is determined (step S41). In a case where the focusing operation is performed, the distance D from the focus area to the portion where the synthesis target image is displayed is acquired (step S42). Next, information on a currently set F number FNo of the imaging lens 4 is acquired (step S43). Next, the blur amount Q is calculated based on the acquired information on the distance D and the F number FNo (step S44). Next, determination is made whether or not the calculated blur amount Q is equal to or larger than a threshold value (step S45). In a case where the calculated blur amount Q is less than the threshold value, the defocus processing is not performed and the processing proceeds to the next brightness processing. On the other hand, in a case where the calculated blur amount Q is equal to or larger than the threshold value, the process of defocusing the synthesis target image is performed (step S46).

Next, the process of changing the brightness is performed. First, information on the brightness at the position where the synthesis target image is disposed in the captured image is acquired (step S47). Next, a difference between the acquired brightness and the brightness of the synthesis target image is calculated (step S48). Next, determination is made whether or not the calculated brightness difference is equal to or larger than a threshold value (step S49). In a case where the brightness difference is less than the threshold value, the process of changing the brightness is not performed and the processing proceeds to the next tone processing. On the other hand, in a case where the brightness difference is equal to or larger than the threshold value, the brightness of the synthesis target image is changed according to the brightness difference (step S50).

Next, the process of changing the tone is performed. First, information on the white balance correction amount for the captured image is acquired (step S51). Next, determination is made whether or not the white balance correction equal to or larger than the threshold value is applied to the neutral position, based on the acquired white balance correction amount information (step S52). In a case where the white balance correction equal to or larger than the threshold value is not applied, the process of changing the tone is not performed and the processing proceeds to next step S54. On the other hand, in a case where the white balance correction equal to or larger than the threshold value is applied, the tone of the synthesis target image is changed based on the white balance correction amount with respect to the neutral position (step S53).

Thereafter, the presence or absence of the image recording instruction is determined (step S54). In a case where there is no recording instruction, the processing returns to step S41, and the above processing is repeatedly executed. Accordingly, the synthesis target image is processed as necessary.

The user views the image observed from the viewfinder eyepiece portion 10b and adjusts the layout of the synthesis target image (step S34). That is, the display position of the synthesis target image is adjusted by operating the cross button 46. Further, the size of the synthesis target image is adjusted by operating the rear command dial 36.

Thereafter, determination is made whether or not the shutter button 14 is fully pressed to determine the presence or absence of the image recording instruction (step S35).

In a case where the image recording is instructed, an image for recording is acquired (step S36). Synthesis processing is performed on the acquired image (step S37). That is, the synthesis target image is pasted with the layout decided by the user to generate a synthesized image. Here, the synthesis target image to be pasted on the captured image is an image that is processed as necessary. That is, the synthesis target image to be pasted on the captured image is an image subjected to the process of defocusing the synthesis target image based on the difference information between the focusing position of the subject and the position where the synthesis target image is disposed, the process of changing the brightness of the synthesis target image according to the brightness at the position where the synthesis target image is disposed, and the process of changing the tone of the synthesis target image according to the white balance correction amount for the captured image. Accordingly, it is possible to acquire the synthesized image with a natural finish without any sense of incompatibility. The generated synthesized image is stored in the storage unit 78.

As described above, with the digital camera 1 according to the embodiment, the synthesis target image is displayed on the optical viewfinder image in a superimposed manner. Therefore, it is possible to generate a synthesized image having a desired layout at the stage of imaging. Further, since the synthesis target image is processed as necessary, it is possible to generate a synthesized image with a natural finish without any sense of incompatibility. Since the synthesis processing is not involved even in the case where the synthesis target image is processed or the like, it is possible to reduce the processing load on the device.

Modification Example

[Acquisition of Synthesis Target Image]

The synthesis target image is acquired from the inside of the digital camera 1 in the above embodiment, but may be acquired from the outside. That is, communication may be made with an external server through the communication unit 80, and the synthesis target image may be acquired from the external server. A function of searching and browsing Internet information may be included, and an image searched on the Internet may be acquired as the synthesis target image. Accordingly, it is possible to expand the number and kind of synthesis target images that can be acquired.

[Configuration of Operation Unit]

In the above embodiment, the layout of the synthesis target image is adjusted by operating the cross button 46 and the rear command dial 36 in the case where the layout of the synthesis target image is decided. However, an operation means for adjusting the layout of the synthesis target image is not limited thereto. In addition, for example, the rear surface monitor 8 may include a touch panel, and the layout of the synthesis target image may be adjusted by operating the touch panel. In the case, for example, the synthesis target image is moved in a direction where a finger is moved on the screen. The size of the synthesis target image is enlarged by an operation of expanding two fingers on the screen, and the size of the synthesis target image is reduced by an operation of contracting the two fingers.

[Processing of Synthesis Target Image]

In the above embodiment, the process of defocusing an image, the process of changing the brightness, and the process of changing the tone are performed on the synthesis target image. However, the processing performed on the synthesis target image is limited thereto. Other known processing methods may be employed. Further, at least one piece of processing may be performed.

In the above embodiment, the process of lowering the resolution of the image is performed as the process of defocusing the image. However, the process of defocusing the image is not limited thereto. In addition, a known method may be employed. The same applies to the brightness and the tone, and a known method may be employed. In the above embodiment, the blur amount is calculated based on the distance and the F number. However, the method of obtaining the blur amount is not limited thereto.

In the above embodiment, the synthesis target image is processed automatically. However, the synthesis target image may be processed manually by the user. For example, a processing menu may be prepared, and various types of processes may be performed on the synthesis target image by operating the operation unit 6. Accordingly, it is possible to generate a synthesized image closer to the preference of the user.

[Configuration of Imaging Device]

In the above embodiment, the case where the invention is adapted to the lens-integrated digital camera is described as an example. However, the adaption of the invention is not limited thereto. The invention can be similarly adapted to any imaging device including a hybrid type viewfinder device.

A hybrid type viewfinder can be composed even in a case of a viewfinder for a single-lens reflex camera by including a transmissive LCD on a focus plate. That is, it is possible to superimpose predetermined information on the optical viewfinder image to be observed from the viewfinder eyepiece portion.

[Others]

In the above embodiment, each function of the synthesis target image acquisition unit, the layout deciding unit, the synthesis target image processing unit, the superimposition display control unit, the synthesized image generation unit, and the like is realized by a computer. However, a hardware configuration for realizing the functions is not limited thereto. The above functions can be realized by various processors. The various processors include a CPU which is a general-purpose processor that functions as a processing unit performing various types of processing by executing software (program), a programmable logic device (PLD) which is a processor whose circuit configuration is changeable after manufacturing such as a field programmable gate array (FPGA), a dedicated electrical circuit which is a processor having a circuit configuration specially designed for executing specific processing such as an application specific integrated circuit (ASIC), and the like.

One processing unit may be composed of one of these various types of processors or may be composed of two processors or more having the same type or different types. For example, the one processing unit may be composed of a plurality of FPGAs or may be composed of a combination of the CPU and the FPGA.

Further, a plurality of processing units may be composed of one processor. A first example in which the plurality of processing units may be composed of one processor is a form in which one processor is composed of a combination of one or more CPUs, as represented by computers such as a client and a server, and software, and the processor functions as the plurality of processing units. A second example thereof is a form in which a processor, as represented by a system on chip (SoC) or the like, that realizes the functions of the entire system including the plurality of processing units by one integrated circuit (IC) chip is used. In this manner, the various types of processing units are composed by using one or more processors of the various processors described above as the hardware structure.

Furthermore, more specifically, the hardware structure of these various processors is an electric circuit that combines circuit elements such as semiconductor elements.

EXPLANATION OF REFERENCES

1: digital camera
2: camera body
4: imaging lens
4*f*: focus lens group
4*i*: stop
6: operation unit
8: rear surface monitor
8*dr*: LCD driver
10: viewfinder device
10*a*: viewfinder window
10*b*: viewfinder eyepiece portion
12: power lever
14: shutter button
16: first function button
18: exposure correction dial
20: sensitivity dial
22: front command dial
24: viewfinder switching lever
26: second function button
28: focus mode switching lever
30: view mode button
32: photometry mode button
34: AE lock button
36: rear command dial
38: focus lever
40: playback button
42: erase button
44: back button
46: cross button
48: MENU/OK button
50: AF lock button 52: quick menu button
60: viewfinder first optical system
60a: objective lens group
60b: eyepiece lens group
62: viewfinder LCD
62dr: viewfinder LCD driver
64: viewfinder second optical system
64a: half prism
64a1: semipermeable membrane
64b: target lens group
66: liquid crystal shutter
66dr: liquid crystal shutter driver
70: image sensor
72: image sensor drive unit
74: analog signal processing section
76: digital signal processing section
78: storage unit
80: communication unit
82: focus lens drive mechanism
84: stop drive mechanism
100: camera microcomputer
112: focus control unit
114: exposure setting unit
116: image sensor drive control unit
118: stop control unit
120: rear surface monitor display control unit
122: storage control unit
124: communication control unit
126: viewfinder LCD display control unit
128: liquid crystal shutter drive control unit
140: synthesis target image acquisition unit
142: layout deciding unit
144: synthesis target image processing unit
146: synthesized image generation unit
A: subject
F: AF frame
FC: processing target frame
L: optical axis of imaging lens
P1: position of gravity center of synthesis target image
P2: position of focus area
a: subject
b: synthesis target image
f: frame indicating imaging range
w: region
S1 to S6: processing procedure for process of defocusing synthesis target image
S11 to S14: processing procedure of process of changing brightness of synthesis target image
S21 to S23: processing procedure of process of changing tone of synthesis target image
S31 to S37: processing procedure of imaging in synthesized photograph mode
S41 to S54: processing procedure of image processing for synthesis target image

What is claimed is:

1. An imaging device comprising:
an imaging lens;
an image sensor configured to receive light passing through the imaging lens and capture an image;
an operation unit;
an optical viewfinder;
a superimposition display configured to superimpose and display information to be output on an optical viewfinder image observed by the optical viewfinder; and
a processor configured to:
acquire a synthesis target image;
decide a layout of the synthesis target image based on an operation of the operation unit;
process the synthesis target image based on an image to be captured by the image sensor;
control the superimposition display to superimpose and display the processed synthesis target image on the optical viewfinder image in the decided layout;
acquire the image captured by the image sensor in response to an image recording instruction from the operation unit; and
synthesize the acquired image and the processed synthesis target image in the decided layout to generate a synthesized image.

2. The imaging device according to claim 1,
wherein the processor is configured to perform a process of defocusing the synthesis target image based on difference information between a focusing position of a subject and a position where the synthesis target image is disposed.

3. The imaging device according to claim 2,
wherein the processor is configured to change a defocus amount according to an F number of the imaging lens.

4. The imaging device according to claim 2,
wherein the processor is configured to change a resolution of the synthesis target image as the process of defocusing the synthesis target image.

5. The imaging device according to claim 1,
wherein the processor is configured to change brightness of the synthesis target image according to brightness of a position where the synthesis target image is disposed.

6. The imaging device according to claim 1,
wherein the processor is configured to change a tone of the synthesis target image according to a white balance correction amount of the image captured by the image sensor.

7. The imaging device according to claim 1,
wherein the processor is configured to:
cause at least one of setting information of the imaging device or a frame indicating an imaging range to be superimposed and displayed on the optical viewfinder image as an in-viewfinder display, and
change a display mode of the in-viewfinder display in a case where the synthesis target image overlaps the in-viewfinder display.

8. The imaging device according to claim 7,
wherein the processor is configured to change brightness of the in-viewfinder display in the case where the synthesis target image overlaps the in-viewfinder display.

9. The imaging device according to claim 1,
wherein the processor is configured to communicate with a server to acquire the synthesis target image from the server.

10. The imaging device according to claim 1,
wherein the operation unit includes a touch panel, and
wherein the processor is configured to decide the layout of the synthesis target image based on an operation of the touch panel.

11. The imaging device according to claim 1,
wherein the processor is configured to further process the synthesis target image based on the operation of the operation unit.

* * * * *